United States Patent
Lopez et al.

(10) Patent No.: US 9,910,651 B2
(45) Date of Patent: Mar. 6, 2018

(54) SYSTEM FOR DEVELOPING, TESTING, DEPLOYING, AND MANAGING APPLICATIONS IN REAL-TIME

(71) Applicant: Verizon Patent and Licensing Inc., Arlington, VA (US)

(72) Inventors: David Lopez, Tampa, FL (US); Benjamin Pomales, Tampa, FL (US); Timothy E. Richmond, Hernando, FL (US); Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 14/840,102

(22) Filed: Aug. 31, 2015

(65) Prior Publication Data

US 2017/0060562 A1    Mar. 2, 2017

(51) Int. Cl.
  *G06F 9/445*   (2006.01)
  *G06F 9/44*    (2018.01)
(52) U.S. Cl.
  CPC ............... *G06F 8/60* (2013.01); *G06F 8/38* (2013.01); *G06F 8/65* (2013.01); *G06F 8/71* (2013.01)
(58) Field of Classification Search
  CPC .............. G06F 8/65; G06F 8/38; G06F 8/71
  See application file for complete search history.

(56) References Cited

U.S. PATENT DOCUMENTS

| | | | | |
|---|---|---|---|---|
| 7,293,034 B2 * | 11/2007 | Paya | ................... | G06F 17/3089 |
| 2005/0108571 A1 * | 5/2005 | Lu | ................... | G06F 21/34 |
| | | | | 726/4 |
| 2008/0178169 A1 * | 7/2008 | Grossner | ................. | H04L 67/16 |
| | | | | 717/170 |
| 2009/0063493 A1 * | 3/2009 | Fukata | ................ | G03G 15/5066 |
| 2011/0231784 A1 * | 9/2011 | Meng | ........................ | G06F 8/38 |
| | | | | 715/762 |
| 2013/0232216 A1 * | 9/2013 | Tiger | ................ | H04W 52/0209 |
| | | | | 709/213 |
| 2015/0169318 A1 * | 6/2015 | Nash | ........................ | G06F 8/34 |
| | | | | 717/168 |

(Continued)

FOREIGN PATENT DOCUMENTS

WO    WO 2004086729 A1 * 10/2004    ....... G06F 17/30876

OTHER PUBLICATIONS

Debajyoti Mukhopadhyay and Archana Chougule, An Approach to Manage Ontology Dynamically based on Web Service Composition Request, ACM, Sep. 2012, retrieved online on Jul. 26, 2017, pp. 653-658. Retrieved from the Internet: <URL: http://delivery.acm.org/10.1145/2390000/2381841/p653-mukhopadhyay.pdf?*

*Primary Examiner* — Hanh T Bui

(57) ABSTRACT

A method, a device, and a non-transitory storage medium having instructions to deploy files of a web-based application, wherein a deploying includes: receive an upload of the files from a user device via a web browser, and store the files; receive from the user device via the web browser, a first request to run the web-based application that has been deployed; run the web-based application in response to the first request, and wherein during a running of the web-based application: determine a type of a second request for data to be used to generate a user interface of the web-based application; obtain the data based on the type of the second request; and render the user interface based on the obtained data.

20 Claims, 23 Drawing Sheets

(56) References Cited

U.S. PATENT DOCUMENTS

| | | | |
|---|---|---|---|
| 2015/0227357 A1* | 8/2015 | Zamir | G06F 8/65 717/173 |
| 2017/0199728 A1* | 7/2017 | Woods | G06F 8/71 |

* cited by examiner

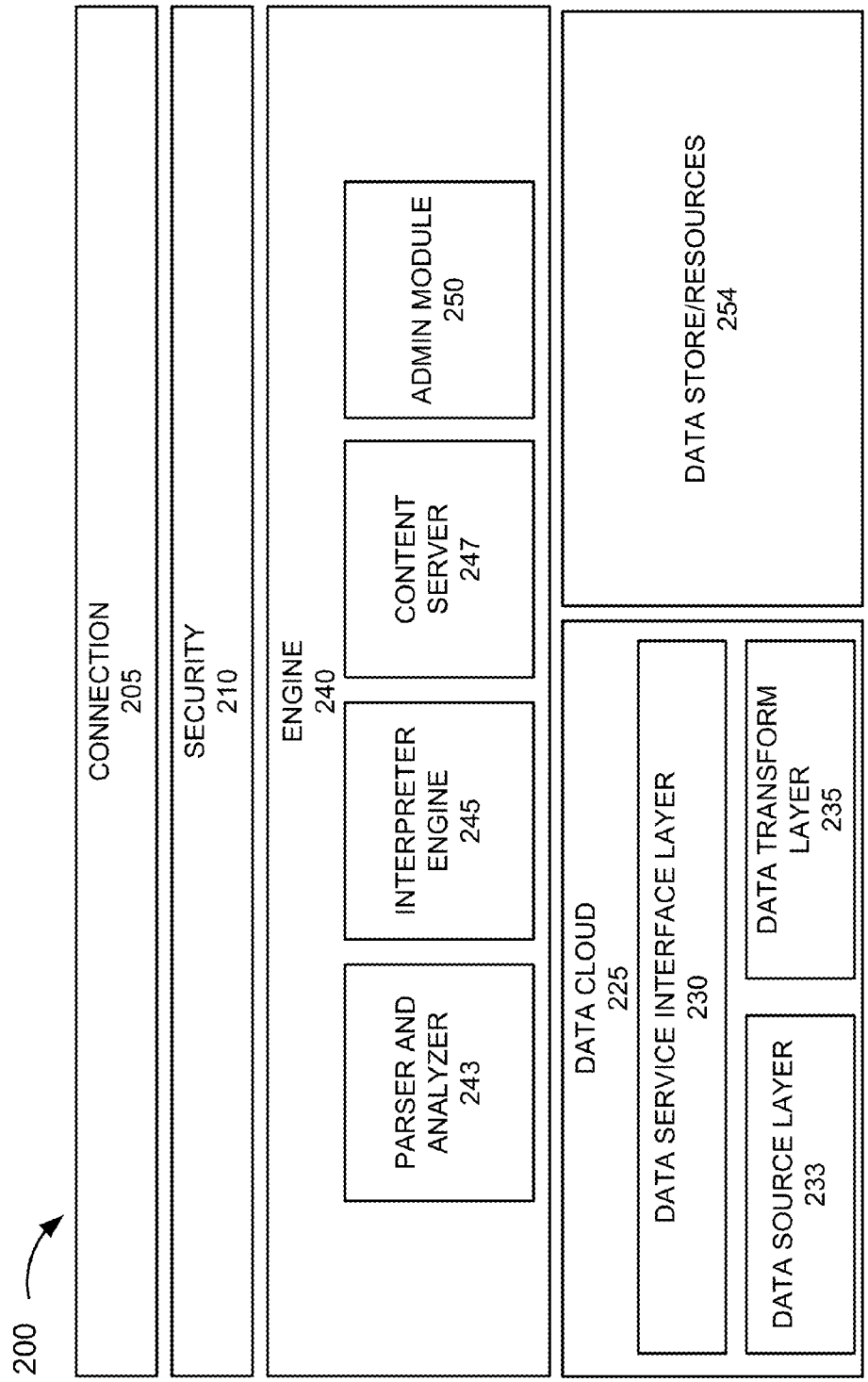

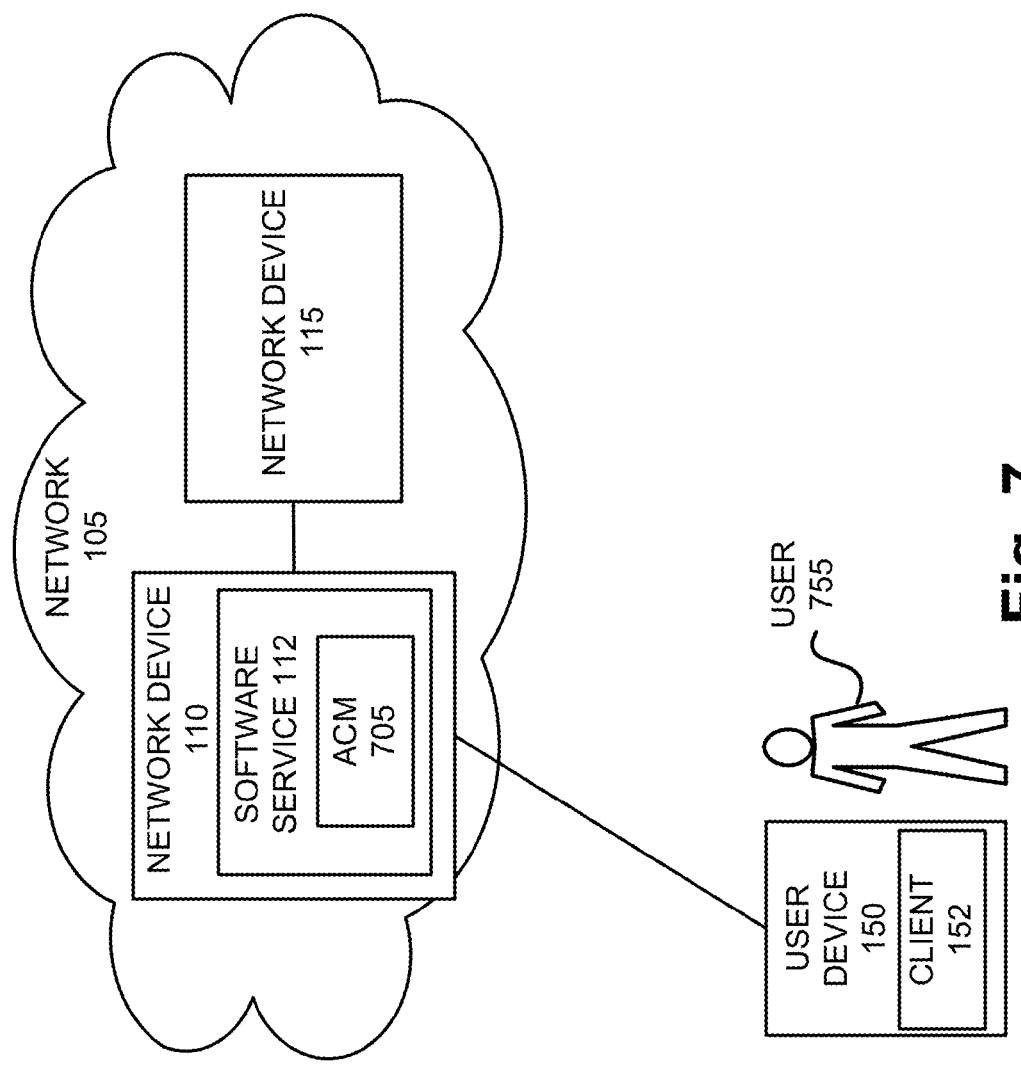

SYSTEM FOR DEVELOPING, TESTING, DEPLOYING, AND MANAGING APPLICATIONS IN REAL-TIME

BACKGROUND

Typically, development of software (e.g., an information technology (IT) application, an enterprise application, a Web-based application, etc.) can take a prolonged amount of time (e.g., months) and may involve multiple environments (e.g., a development environment, a test environment, a production environment, etc.) with multiple developmental teams coordinating together. For example, an IT application may be very large and comprise various components, which are inter-dependent amongst each other and are built by different developmental teams.

In addition to these complexities, decisions to change the software can occur during any stage of development, resulting in developers having to make the change to the software and also to get the change deployed. For example, developers may check-in their changes of an application. Thereafter, the developer and/or a support team will build the entire application and deploy the application in a given environment. However, when there is a compilation error due to a bug introduced by the change, the entire process has to be halted. Since a deployment team usually has a specific time window within which they have to deploy the application changes, when the bug occurs, the deployment team has to wait until the next deployment time window to occur before further deployment measures can be taken.

Other types of issues can arise during the development of software. For example, if a version of the software deployed needs to be rolled back to a previous version, the rollback process can be tedious, cumbersome, and result in an inordinate amount of downtime. Additionally, the software may also have to be distributed to multiple environments and deployed on application servers, which requires use of the resources of the application servers. As a result, typical deployment procedures may require that special user accounts having administrative privileges be set up to enable users to deploy the software on the application servers and/or within the multiple environments. Such deployment procedures, while perhaps necessary, can be time intensive, limiting in terms of available personnel to perform a deployment, etc.

BRIEF DESCRIPTION OF THE DRAWINGS

FIG. 2 is a diagram illustrating an exemplary architecture of a network device that provides the software service depicted in FIG. 1;

FIG. 7 is a diagram illustrating an exemplary embodiment of the software service.

DETAILED DESCRIPTION OF PREFERRED EMBODIMENTS

Figure 1:
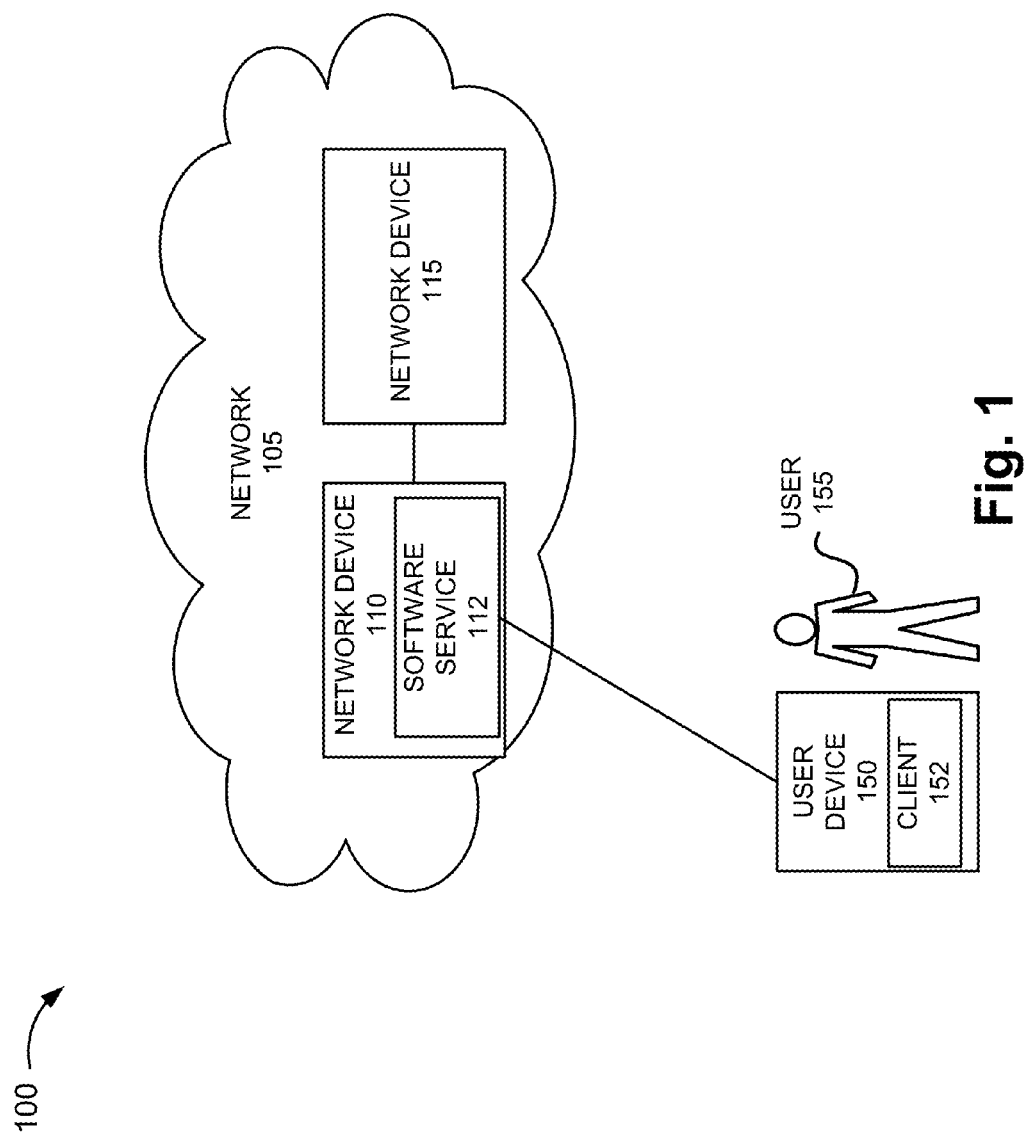
FIG. 1 is a diagram illustrating an exemplary environment in which exemplary embodiments of the software service may be implemented.

The following detailed description refers to the accompanying drawings. The same reference numbers in different drawings may identify the same or similar elements. Also, the following detailed description does not limit the invention.

According to an exemplary embodiment, a system and method is described that provides for the development, testing, deployment, and managing (e.g., rollback, etc.) of software in real-time. According to an exemplary embodiment, the software developed can be any type of web-based application. For example, the web-based application may be any type of enterprise-type of application or other type of application.

According to an exemplary embodiment, a server device hosts the web-based application. According to an exemplary implementation, the server device includes a UNIX-based server device. Once deployed, the web-based application may be used, for example, by any type of end device (e.g., a smart phone, a tablet, a computer, etc.) that includes a web browser. Additionally, according to an exemplary embodiment, the software can operate with legacy software or applications, which are built using older technologies, as long as the legacy software/application is web-enabled. Additionally, according to an exemplary embodiment, the software uses a unified user interface (UUI) framework that allows multiple types of end user devices to access and use the software once deployed.

According to an exemplary embodiment, the system allows a user (e.g., developer, etc.) to build self-contained software that does not need compilation and building. Rather, the system uses interpreters to execute instructions in code and generate content that will be rendered by the web browser. According to an exemplary embodiment, the software includes a core application-coded file, a Cascading Style Sheet (CSS) file, a HyperText Markup Language (HTML) file, and a script file. According to an exemplary implementation, the core application-coded file is a Java file. According to an exemplary implementation, the script file is a JavaScript file. The software may include other types of files (e.g., property files and configuration files), as described further below.

According to an exemplary embodiment, the system uses a folder structure to store the files of the software. According to an exemplary implementation, the folder structure is a compressed file (e.g., a .zip file) or other archiving format (e.g., jar, etc.), which can be uploaded to the server, and subsequently deployed. The files of the software may be stored in a master folder. The master folder may be named corresponding to the name of the web-application. According to an exemplary embodiment, every upload to the server is automatically versioned, tracked, and can be accessed and updated, via user interfaces or system interfaces via Representational State Transfer Application Program Interfaces (REST APIs).

According to an exemplary embodiment, applications are independent from a deployment standpoint. That is, an upload of an application does not require a downtime of the entire container (e.g., a WebLogic application server). In this way, users can deploy changes in real-time, anytime, without impacting other applications that may be serviced (e.g., hosted or served) by the same server.

According to an exemplary embodiment, the system stores a repository of multiple types of application templates. For example, one type of application template may be directed to search screens that allow an end user of the software, once deployed, to search a database. According to an exemplary implementation, an application template includes all of the files necessary for a user to build the software. For example, the application template may include a core application-coded file (e.g., a Java file), an HTML file, a CSS file, a script file (e.g., a JavaScript file), and a configuration file. In this way, the system affords a microservice architecture that allows the user to develop and build software more readily by using already existing application templates. As described herein, the system also allows the user to edit files that are included in an application template, if desired, or not even use the application template and/or a file of the application template (e.g., a CSS file, etc.) when developing and building the software. That is, the user may elect to build the software from scratch by creating all or a portion of the files necessary via the administrative user interfaces.

According to an exemplary embodiment, the system includes user interfaces that allow the user to perform various tasks during development, testing, deployment, and rollback of software. For example, the user interfaces allow the user to create the files of the software and edit the files of the software locally on a user device. The user interfaces also allow the user to create and store multiple versions of a file and/or the software on the user device. The user interfaces allow the user to upload the software (e.g., new, edited version, etc.) to and deploy the software via the server. Additionally, the user interfaces allow the user to undeploy the software when desired. The user interfaces further allow the user to rollback the software to any version that has been uploaded and stored on the server and re-deploy the software in real-time. According to an exemplary embodiment, the user interfaces are provided in a web browser environment (i.e., via a web browser).

According to an exemplary embodiment, the server provides a software service based on the system. According to an exemplary embodiment, the server includes a RESTful web service component that routes requests received from browsers of user devices operated by users of the software service. For example, the requests are Hypertext Transfer Protocol (HTTP) GET requests to resources. Using software services, developers can upload new applications or change existing applications by uploading archive files containing new or changed versions of the files. The RESTful web service component may be implemented based on Java API for RESTful Web Services (JAX-RS) defined in Java Specification Request (JSR) 311. According to an exemplary embodiment, the RESTful web service component includes cache control and entity tag (etag) handling functions.

According to an exemplary embodiment, the RESTful web service component routes the request based on a determination as to the type of request. According to an exemplary implementation, the type of request is categorized as either a static request or a dynamic request. According to an exemplary implementation, a different Uniform Resource Locator (URL) path is used for static requests compared to dynamic requests.

According to an exemplary embodiment, when the request is determined to be a static request and cacheable, the RESTful web service component responds to the HTTP GET request with an HTTP 200 status code message, along with cache settings, and an entity tag value. When the cache time window expires, the user device sends a conditional GET request to the server using an If-Modified-Since header and the etag value to ask if the requested resource has changed. In response to receiving the conditional GET request, the RESTful web service component checks whether the entity tag value received in the conditional GET request matches the latest entity tag value for the requested resource. The RESTful web service may store a data structure or other form of data entity that includes a mapping between resources and entity tag values. The RESTful performs a lookup based on the stored data. When there is a match between entity tag values, the RESTful web service determines that the resource state has not changed and the server returns an HTTP 304 (Not Modified) message, which omits the resource requested, to the browser. In response to receiving the HTTP 304 message, the browser may obtain the requested resource in its cache. When there is not a match between entity tag values, the engine retrieves the resource from a content server, and returns the resource along with an updated entity tag value to the browser.

According to an exemplary embodiment, when the request is a dynamic request, a parser and analyzer component of the engine determines the resources needed to service the request. According to an exemplary embodiment, depending on the type of output that is obtained, the parser and analyzer component may forward the output to an interpreter engine. For example, the interpreter engine may be implemented by a BeanShell engine. The interpreter engine interprets the application-coded file, such a Java file, to apply any business logic. If an HTML output needs to be generated, the interpreter engine generates text output (e.g., an HTML web page, etc.) based on a template engine (e.g., a FreeMarker engine), and changes the data. The interpreter engine will also include any relevant CSS element and/or JavaScript element that need(s) to be sent to the web browser. During the interpretation process, calls to other systems or databases may be performed using a data service interface layer in a data cloud for the purpose of retrieving data that will be used in applying business logic or generating HTML content. In either case, the output received from the data service interface layer or the output received from the interpreter engine is served to the web browser.

According to an exemplary embodiment, the system includes control mechanisms to ensure that each action by a user is audited. Additionally, the system includes a security layer that controls access and use of the system platform. According to an exemplary embodiment, the system includes administrative-level user interfaces that allow the user to manage various facets of the system. For example, the administrative-level user interfaces allow an administrator to set policies, govern access and security measures, upgrade the system platform to be operable with a new, existing, and/or different file format, software format (e.g., .NET application/framework), update templates, and/or any other type of functionality associated with the software service.

As described, the system may allow users to develop software the same day a requirement is received, and after sufficient testing, deploy without compromising quality. Additionally, from a business standpoint, a time-to-market may be dramatically reduced because the system may allow business partners to accelerate the prototyping and trialing of their software.

FIG. 1 is a diagram illustrating an exemplary environment 100 in which exemplary embodiments of an software service may be implemented. As illustrated, environment 100 includes a network 105. Network 105 includes a network device 110 and a network device 115. As further illustrated, environment 100 includes a user device 150. User device 150 is operated by a user 155.

Environment 100 may be implemented to include wireless and/or wired connections. A connection may be direct or indirect and may involve an intermediary device and/or an intermediary network not illustrated in FIG. 1. For example, the connection between user device 150 and network device 110 may be indirect and involve other nodes or devices.

A device (e.g., network device 110, network device 115, and/or user device 150) may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device). Also, according to other embodiments, one or more functions and/or processes described as being performed by a particular device may be performed by a different device, or some combination of devices.

The number of devices, the number of networks, and the configuration in environment 100 are exemplary. According to other embodiments, environment 100 may include additional devices, fewer devices, and/or differently arranged devices, than those illustrated in FIG. 1. For example, multiple devices may be implemented as a single device. Additionally, or alternatively, a single device may be implemented as multiple devices. Additionally, or alternatively, according to other embodiments, environment 100 may include additional networks Network 105 includes one or multiple networks of one or multiple types that provide access to an software service, as described herein. Network 105 may be implemented to include a wired network and/or a wireless network. Network 105 may be implemented as a private network or a public network. According to an exemplary implementation, network 105 is an Internet Protocol (IP)-based network.

Network device 110 includes a network device that provides a software service, as described herein. For example, as illustrated, network device 110 includes a software service component 112 that provides the software service on behalf of users. According to an exemplary embodiment, network device 110 includes a network server device. For example, network device 110 may be implemented as a UNIX-based server.

Network device 115 includes a network device that stores data and libraries pertaining to the software developed, tested, deployed, etc. According to an exemplary embodiment, network device 115 may include databases, libraries pertaining to various programming languages (e.g., Java, Python, Ruby, JavaScript, etc.), and media content (e.g., images, video, etc.).

User device 150 includes an end user device. User device 150 may be a mobile device. For example, user device 150 may be implemented as a smartphone, a tablet device, a netbook, a computer (e.g., a laptop, a palmtop, etc.), or another type of mobile device. Alternatively, user device 150 may be a non-mobile (e.g., stationary) device. For example, user device 150 may be implemented as a terminal or desktop computer.

According to an exemplary embodiment, user device 150 includes a client 152. For example, client 152 may be implemented as a web browser (e.g., Internet Explorer, Firefox, Chrome, etc.). As previously described, client 152 allows user 155 to develop, test, deploy, and rollback software all within a browser environment. Client 152 displays the user interfaces of the software service, and allows user 155 to work with various types of files, programming languages, libraries, etc., to develop, test, deploy, and rollback the software. User 155 operates user device 150 and connects to network device 110 via client 152. For example, user device 150 connects to network device 110 via an HTTP connection or an HTTP Secure (HTTPS) connection.

FIG. 2 is a diagram illustrating an exemplary architecture 200 of network device 110 and network device 115. Network device 110 includes a connection layer 205, a security layer 210. Network device 110 further includes an engine 240. Engine 240 includes a parser and analyzer 243, an interpreter engine 245, a content server 247, and an administrative module 250. Network device 115 includes a data cloud layer 225. Data cloud layer 225 includes a data service interface layer 230, a data source layer 233, and a data transformation layer 235. Network device 115 also includes data store/resources 254. According to other embodiments, network device 110 and/or network device 115 may include additional, fewer, and/or different elements of architecture 200.

Connection layer 205 includes logic that provides a connection service to the software service. For example, connection layer 205 provides connectivity and a communication link to network device 110 based on HTTP and/or HTTPS.

Security layer 210 includes logic that provides security services. For example, security layer 210 may include authentication and authorization services relative to users of the software service. Security layer 210 may use well-known technologies pertaining to authentication and authorization, as well as other forms of security measures, such as encryption, message confidentiality, content validation, virus protection, denial of service protection, etc., to provide a secure environment.

Data cloud 225 includes logic that provides a data service. Data cloud 225 allows for communication between various systems, databases, data, etc. Data cloud 225 also enables various functions to be performed, such as the reading and writing of data, executing web service calls, running Structured Query Languages (SQLs), etc. Data cloud 225 may communicate with remote network devices, systems, etc., (not illustrated) to provide the data service. For example, the remote network devices may be operated by third parties. According to an exemplary embodiment, data cloud 225 includes a data service interface layer 230, a data source layer 233, and a data transform layer 235.

Data service interface layer 230 supports various data services. For example, data service interface layer 230 supports Java Database Connectivity (JDBC), Web Service (WS), Message Q (MQ), Java Script Object Notation (JSON), and JavaScript (JS). Data service interface layer 230 support different protocols and interfaces to provide the data services.

Data source layer 233 stores data pertaining to the communication and interaction with various providers of data which may include applications, services, or databases. For example, data source layer 233 may store network addresses (e.g., Uniform Resource Locators (URLs), Internet Protocol (IP) addresses, etc.), configurations and parameters pertaining to various functions, services, etc, that may be invoked to provide the data service. For example, data source layer 233 may store the URL of a web service of a particular system, the type of web service call to invoke, parameters pertaining to the web service call, etc. Data source layer 233 may store the data in various types of databases, files, folders, records, etc. Data source layer 233 may also concatenate or stitch together multiple data sources to provide a single data service. Data source layer 233 may support various types of database management systems (DBMSs), such as Oracle, Cassandra, etc.

Data transform layer 235 includes logic that transforms data from data source 233. For example, data transform layer 235 may manipulate the data, add, and/or remove content depending on rules that are built into data transform layer 235. Data transform layer 235 may transform data coming in or going out via data service interface layer 230.

Engine 240 includes logic to run applications, in response to requests. Engine 240 also allows users to manage applications, as described herein.

Parser and analyzer 243 includes logic to analyze every request that comes to engine 240 and determine the type of request. According to an exemplary embodiment, there are two categories of requests. For example, parser and analyzer 243 determines whether the request is a static request or a dynamic request. According to an exemplary embodiment, the request is an HTTP request.

According to an exemplary embodiment, parser and analyzer 243 inspects a URL path included in the request to determine the type of request. For example, the URL path may be carried in a request line and/or in a header of the request. According to an exemplary implementation, the URL path includes a string that indicates the request is static. The term "string" is intended to mean one or more characters or symbols. By way of example, the URL path may include the string "static." According to other implementations, the URL path may include another type of string that indicates and/or is interpreted by parser and analyzer 243 to mean that the request is a static request. According to an exemplary implementation, the URL path includes a string that indicates the request is dynamic. For example, the URL path may include the string "dynamic." According to another implementation, the URL path includes an application name and/or another type of string that indicates and/or is interpreted by parser and analyzer 243 to mean that the request is a dynamic request. When the type of request is identified, an appropriate response is provided. For example, when the request is a static request, the response includes static content, and when the request is a dynamic request, the response includes dynamic content.

Interpreter engine 245 includes logic to execute an application-coded file. For example, interpreter engine 245 executes a Java file. Depending on the nature of the instructions included in the application-coded file, interpreter engine 245 may invoke a template engine (e.g., a FreeMarker engine) to generate HTML content based on HTML templates available to engine 240. Interpreter engine 245 may also invoke data store/resources 254 using services offered by data cloud 225 to retrieve data. Engine 240 may further execute business logic embedded within the application-coded file. According to an exemplary embodiment, interpreter engine 245 uses the latest file from the current version of the software, unless the request indicates a particular version (e.g., a version other than the latest version) of the software to run.

Content server 247 includes logic to retrieve from and return back data from data store/resources 254 via data cloud 225. Content server 247 may perform other services, such as the formatting and/or packaging of data to enable the data to be served to a requestor. Content server 247 includes logic to perform intelligent caching.

Administrative module 250 includes logic to provide user interfaces that allow users to manage applications. For example, a user may upload a new application, edit an existing application, manage versions of the application, deploy or roll back specific versions of the application, etc., via the user interfaces provided by administrative module 250. Additionally, the user interfaces allow users to perform these tasks, as well as others, and for these tasks to take effect, in real-time.

Data store/resources 254 host resources that are used by engine 240 or data cloud 225. Data store/resources 254 stores the application files (e.g., zip folders, CSS files, etc.) pertaining to the software being developed, tested, etc. Data store/resources 254 stores application templates, as described herein. Data store/resources 254 stores various types of content, multimedia, data, etc., that may be used and/or accessed during the execution of an application. For example, data store/resources 254 may store images, video clips, enterprise data, customer data, etc. Data store/resource 254 may store various types of databases, such as Oracle, Mongo, etc., files, folders, etc.

Although FIG. 2 illustrates exemplary architecture 200, according to other embodiments, architecture 200 may include additional, fewer, and/or different elements than those illustrated and described.

Figure 3A:
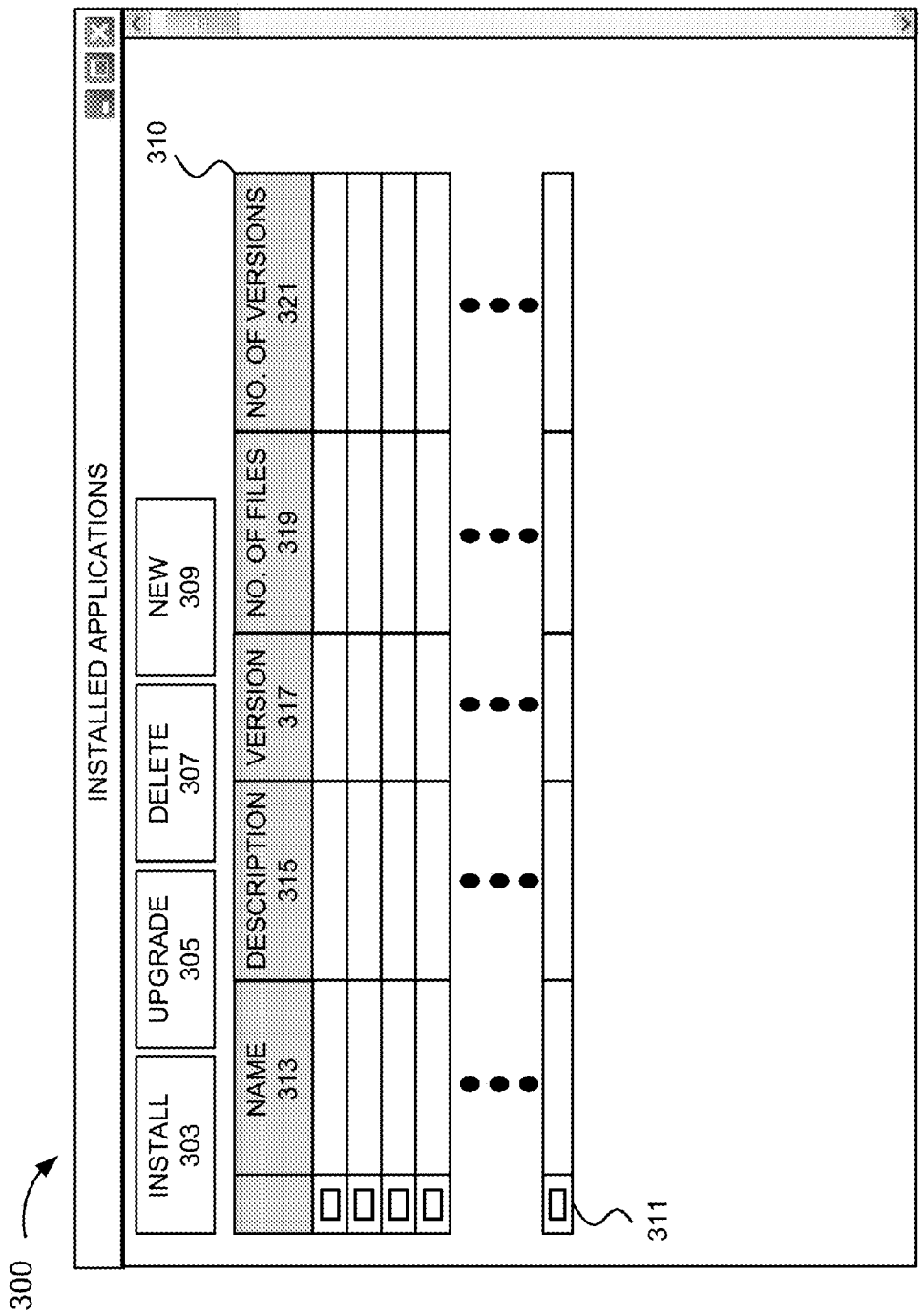
FIGS. 3A-3Q are diagrams illustrating exemplary user interfaces provided by the software service.

As previously described, network device 110 provides various user interfaces that allow user 155 to develop, test, deploy, and rollback software. FIGS. 3A-3Q are diagrams that illustrate exemplary user interfaces according to exemplary scenarios pertaining to the use of the software service. The graphical elements (e.g., buttons, tables, windows, etc.) illustrated and described in relation to the user interfaces depicted in FIGS. 3A-3Q are merely exemplary. According to an exemplary embodiment, the user interfaces illustrated and described in relation to FIGS. 3A-3Q are presented via client 152 (e.g., a web browser).

FIG. 3A is a diagram illustrating an exemplary user interface 300. User interface 300 includes an install button 303, an upgrade button 305, a delete button 307, and a new button 309. Additionally, user interface 300 includes a table 310. As illustrated, table 310 includes a name field 313, a description field 315, a version field 317, a number of files field 319, and a number of versions field 321. Table 310 also includes a selection area 311 that allows user 155 to select one or multiple rows of table 310 to which a given action pertains, as described further below.

Generally speaking, user interface 300 allows user 155 to manage installed software. For example, install button 303 allows user 155 to install software on network device 110. Upgrade button 305 allows user 155 to upgrade the software installed on network device 110. Delete button 305 allows user 155 to delete the software installed on network device 110. New button 305 allows user 155 to develop software.

Table 310 provides a listing of installed applications and various attributes of the installed applications according to fields 313-321. For example, name field 313 includes data that indicates the name of the installed application. Description field 315 includes data that indicates a description of the installed application. Version field 317 includes data that indicates a version of the installed application. For example, the data may indicate a number (e.g., 1, 2, 3, etc.), a letter (e.g., A, B, C, etc.), or some combination thereof (e.g., 1A, etc.). Number of files field 319 includes data that indicates the number of files that exist for the installed application. For example, the data may indicate a number (e.g., 4, 5, 6, etc.).

As previously described, selection area 311 allows user 155 to select a row of table 310 to which a given action pertains. For example, assume that an application is listed in a first row of table 310. User 155 may select that application via selection area 311 and then delete that application by selecting delete button 307.

Figure 3B:
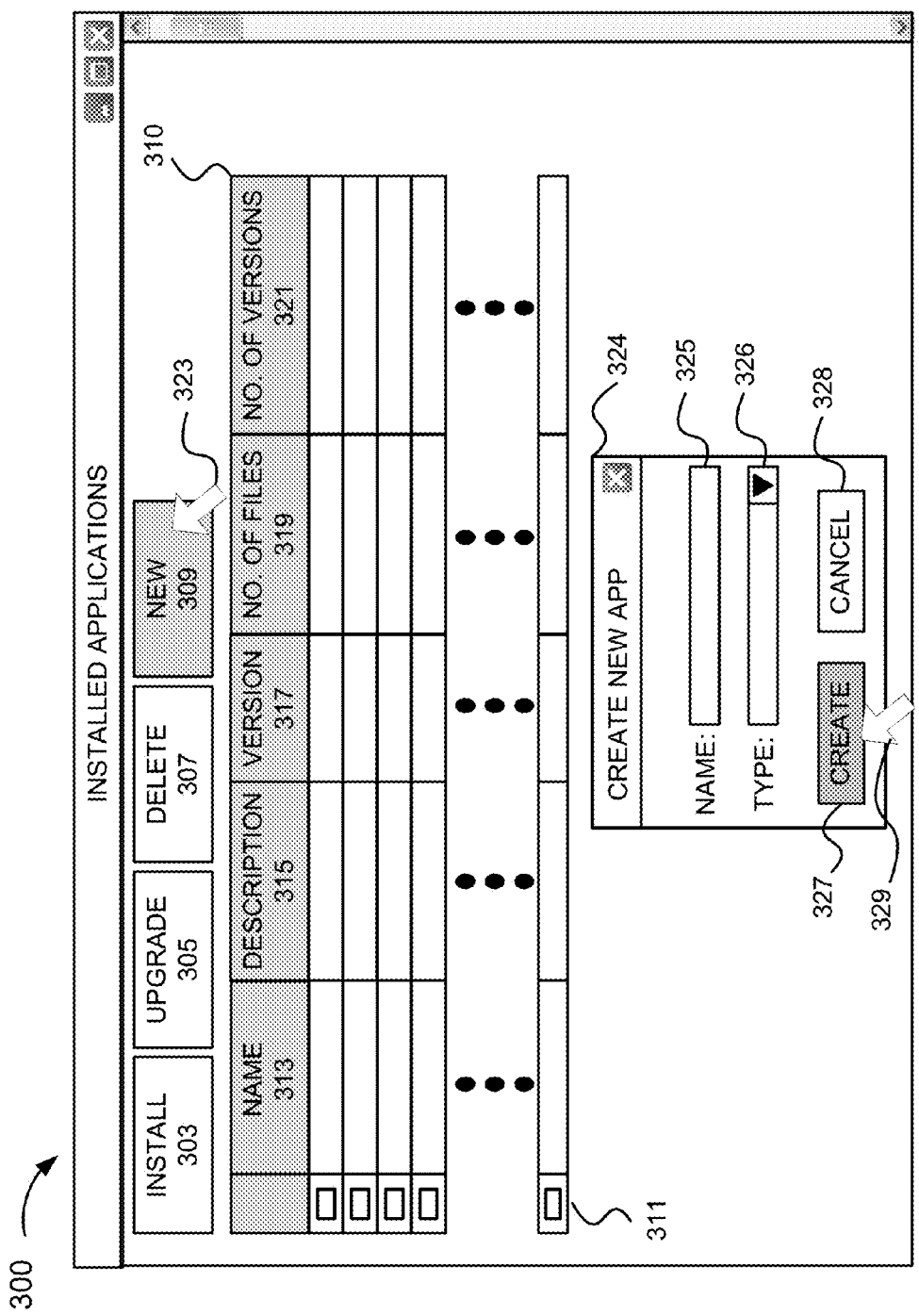

Referring to FIG. 3B, according to an exemplary scenario, assume user 155 selects new button 309 with a cursor 323 to develop a new application using the software service. In response to the selection of new button 309, a window 324 pops up. As illustrated, window 324 includes a name field 325 and a type field 326. User 155 may enter the name of the new application in name field 325. Additionally, user 155 may select a template to use for developing the new application from type field 326. Type field 326 provides a drop down menu that gives user 155 an option to select from available templates to use to begin the development process of the new application. User 155 may elect to use or not use a particular template offered. As described herein, the available templates may pertain to various applications, user interfaces, widgets, files, panels that run on user interfaces, etc., that provide a starting point for user 155 to begin development of the new application. By way of example, a template may provide one or multiple files that can be used to begin the development of a search user interface, which allows an end user to query a database. In this regard, the available templates provide a toolbox of components that can assist user 155 in developing the new application.

As further illustrated, window 324 includes a create button 327 and a cancel button 328. When selected, create button 327 may create and store a folder, which stores files of the new application. Cancel button 328 allows user 155 to cancel the creation of the new application. For purposes of description, assume user 155 selects create button 327 using a cursor 329.

Figure 3C:
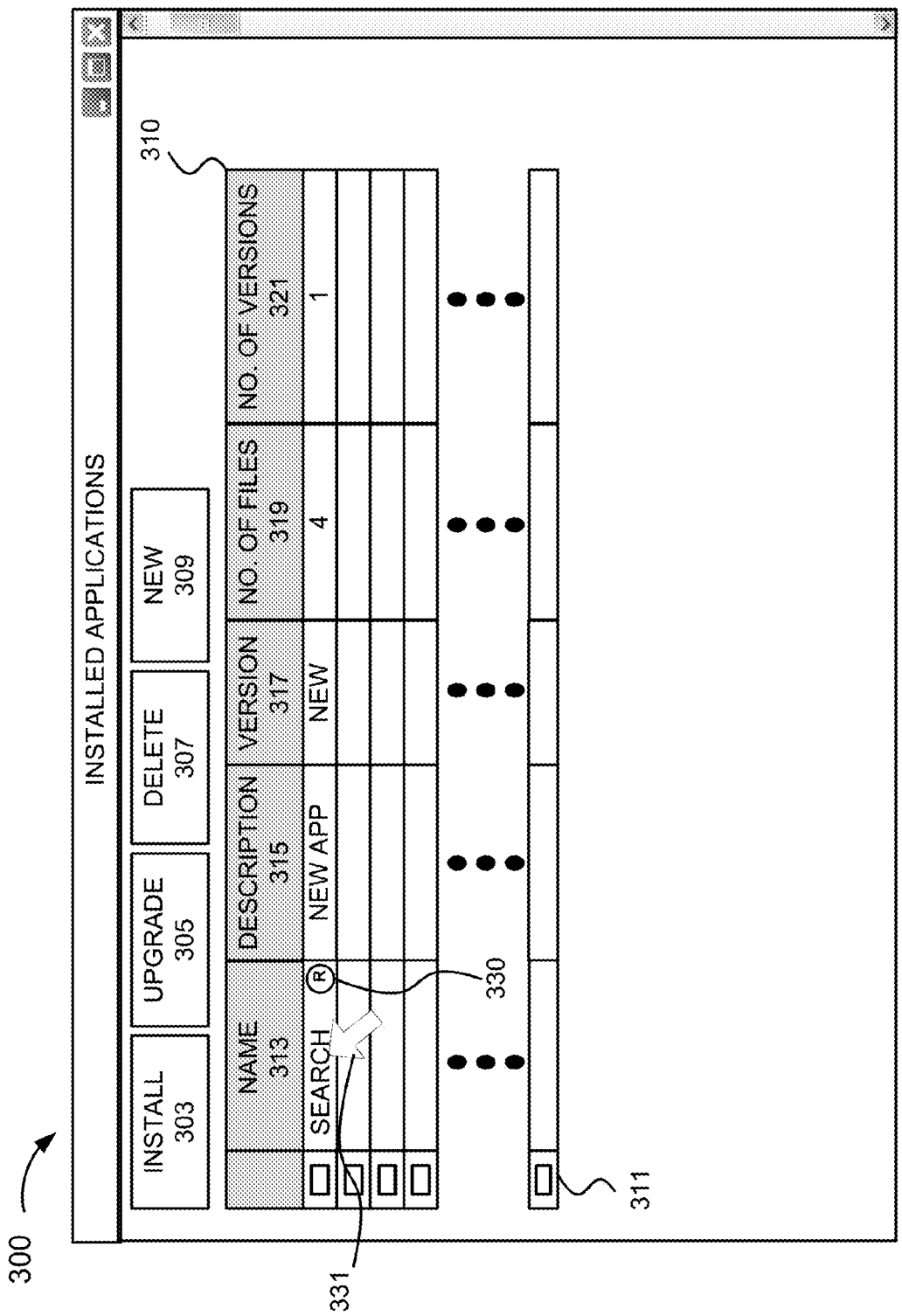

Referring to FIG. 3C, in response to user 155's inputs, a new application is listed in table 310. For example, as illustrated, name field 313 indicates that the new application is named "Search", description field 315 indicates a description of "new app", version field 317 indicates a version of "new", and number of versions field 321 indicates "1." According to this scenario, assume that user 155 selected a template from type field 326. Based on user 155's selection, starting or "dummy" files have been automatically created. In this regard, number of files field 319 indicates that four ("4") files exist. Additionally, name field 313 includes an icon 330, which when selected, runs the new application.

Figure 3D:
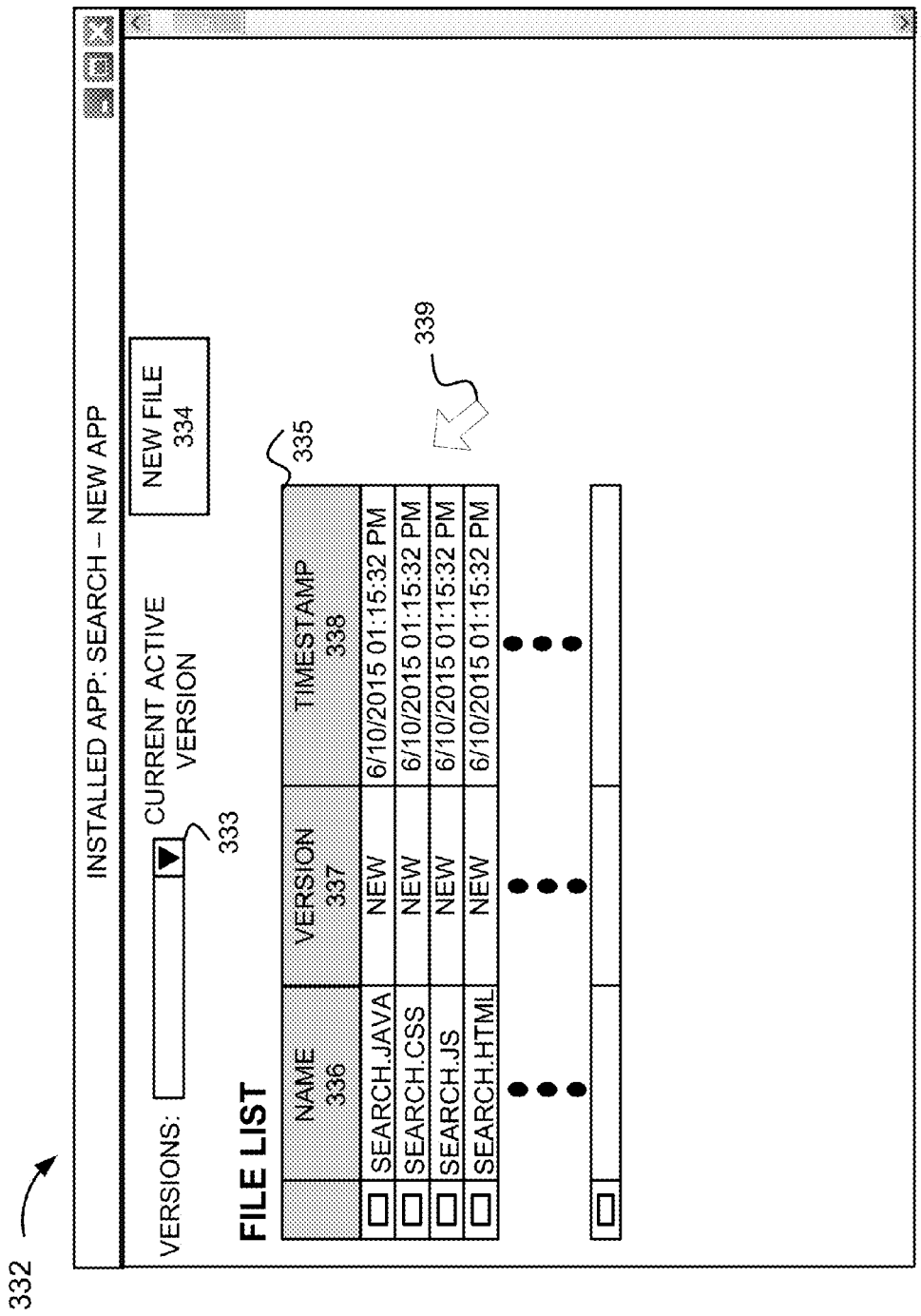

Continuing with this example, assume user 155 selects the name indicated in name field 313 using a cursor 331. For example, the name may be stored in table 310 as a selectable element. Referring to FIG. 3D, in response to user 155's selection of the name, a user interface 332 is displayed. As illustrated, user interface 332 includes a versions element 333 and a new file button 334. Versions element 333 allows user 155 to select a version of an application. Since our example pertains to a new application, there may be only one version available. However, as described further below, when multiple versions of an application exist, user 155 may select the version of the application to run, test, edit, rollback, etc. New file button 334 allows user 155, when selected, to create or add a new file to an application.

As further illustrated in FIG. 3D, user interface 332 includes a table 335. Table 335 provides a listing of files that exist for the new application. For example, according to an exemplary embodiment, a template may automatically create, at a minimum, four files as a starting point for developing a new application. According to such an embodiment, the four files includes a core application-coded file (e.g., a Java file (.java)), a CSS file (e.g., .css), a script file (e.g., a JavaScript file (.js)), and an HTML file (e.g., .html).

As illustrated, table 335 includes a name field 336, a version field 337, and a timestamp filed 338. In accordance with the embodiment just discussed above, according to this example, name field 336 indicates that four files have been created, namely a "search.java" file, a "search.css" file, a "search.js" file, and a "search.html" file. The file names are purely exemplary. Version field 337 indicates a version of the file. Timestamp field 338 indicates a timestamp pertaining to the creation of the file. For example, timestamp field 338 may indicate a date (month, day, year) and a time (hour, minute, and second) a file is created. According to this example, version field 337 indicates that each file is "new." Additionally, timestamp field 338 indicates that each file was created on "6/10/2015 01:15:32 PM."

According to an exemplary implementation, the names of the files are selectable elements, which when selected, navigates user 155 to a user interface that allows user 155 to edit the file. For example, user 155 may select a name of a file (e.g., "search.java", etc.) using a cursor 339.

Figure 3E:
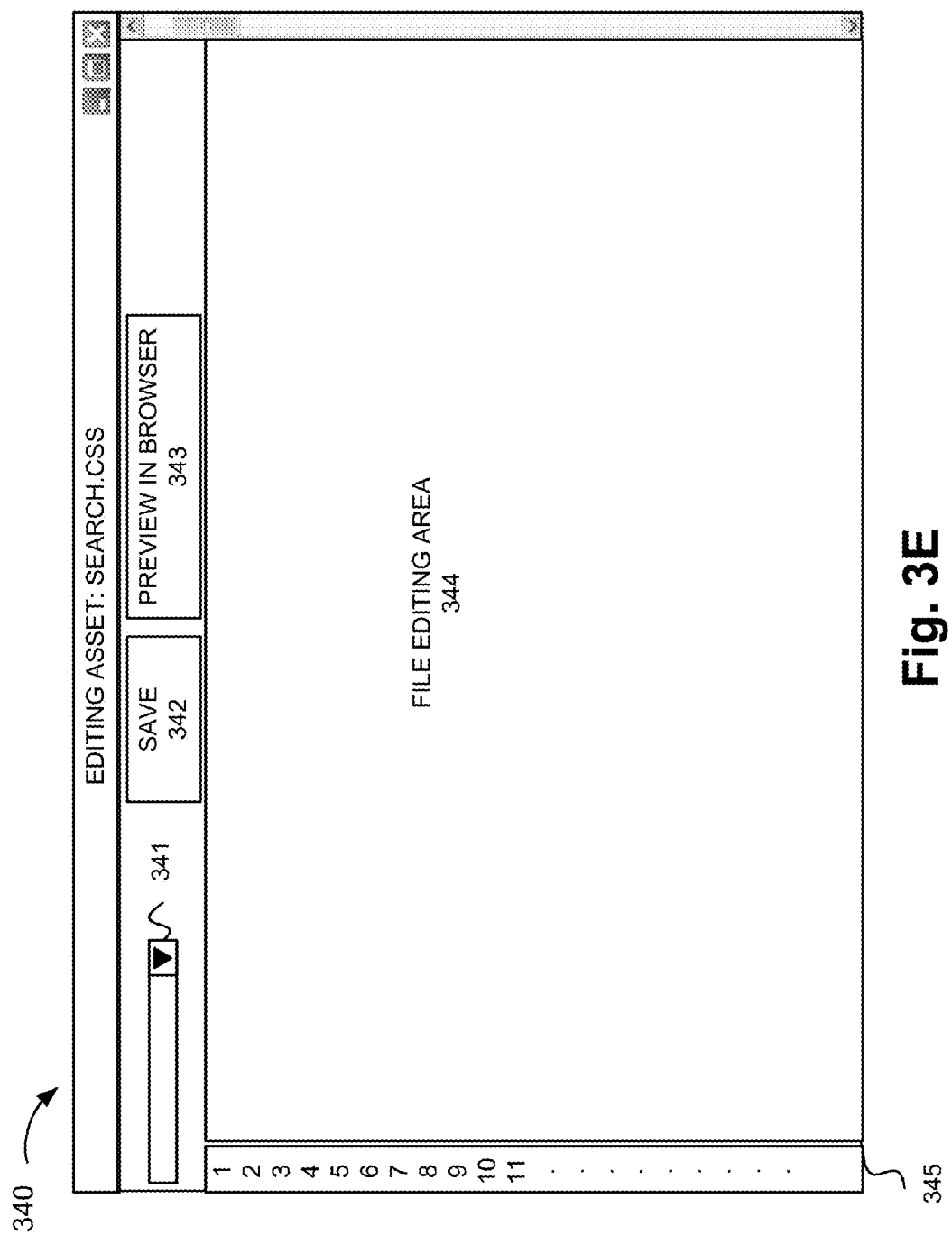

According to this example, assume user 155 selects one of the files listed in table 335. Referring to FIG. 3E, in response to receiving a selection of one of the files, a user interface 340 is provided to user 155. User interface 340 includes a drop down menu 341, a save button 342, and a preview in browser button 343. Drop down menu 341 allows user 155 to view other versions of the file. Save button 342 allows user 155 to save the file along with any edits user 155 may make to a file. Preview in browser button 343 allows user to display the file contents in a web browser. For example, this function may be useful to user 155 because it allows user 155 to see how the web browser will render an HTML file.

Additionally, as illustrated, user interface 340 includes a file editing area 344 and a line numbering area 345. File editing area 344 provides a work area within which user 155 may create, edit, copy, paste, etc., code pertaining to a given file. Line numbering area 345 provides a line number for each line of code pertaining to the file.

Figure 3F:
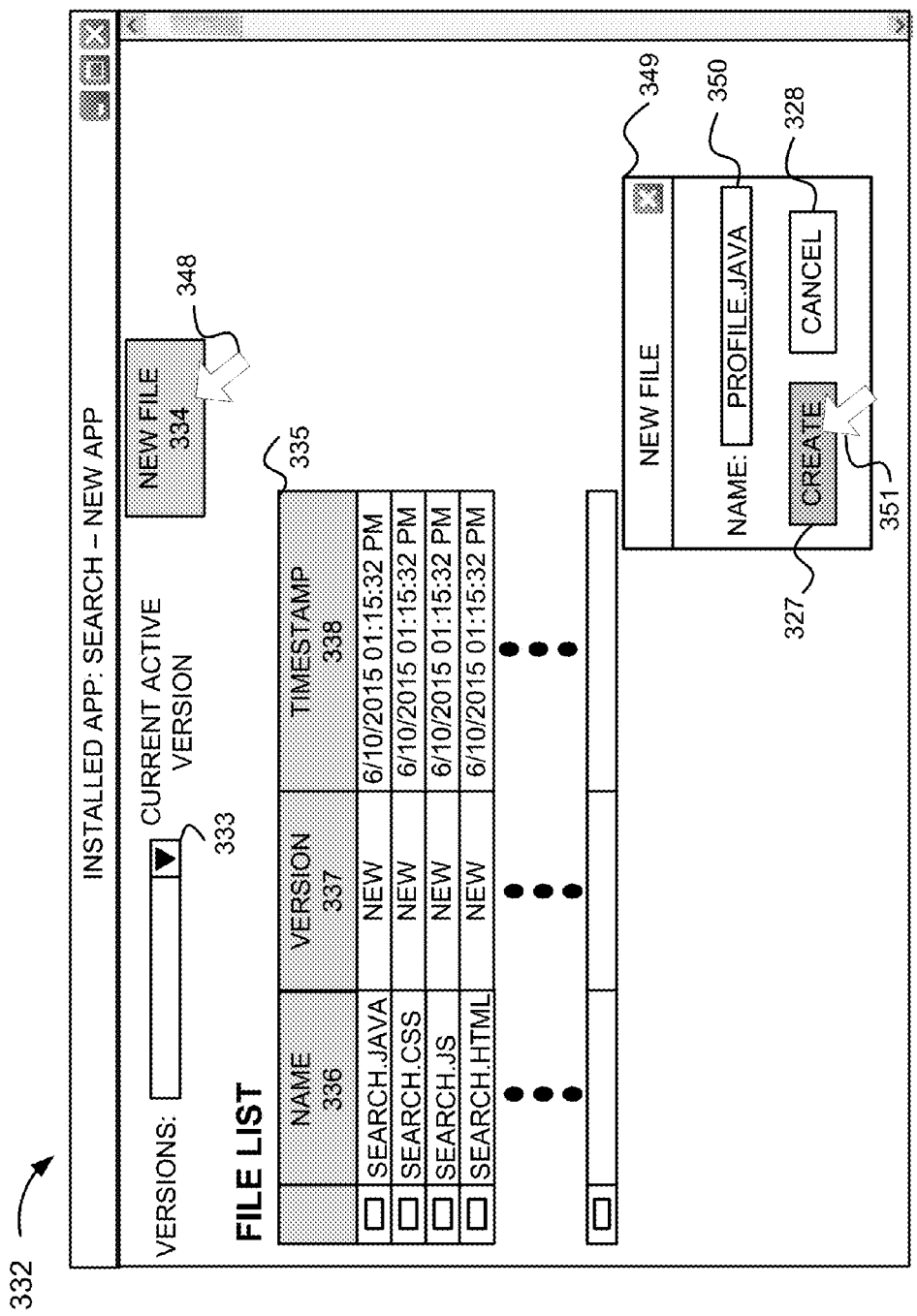

Referring to FIG. 3F, assume user 155 wishes to create a new file for the new application. User 155 selects new file button 334 using a cursor 348. In response, a window 349 pops up. Window 349 includes a name filed 350 that allows user 155 to name the new file. In this example, assume user 155 names the new file as "profile.java." User 155 selects create button 327 using a cursor 351. Additionally, although not illustrated, user 155 creates another new file.

Figure 3G:
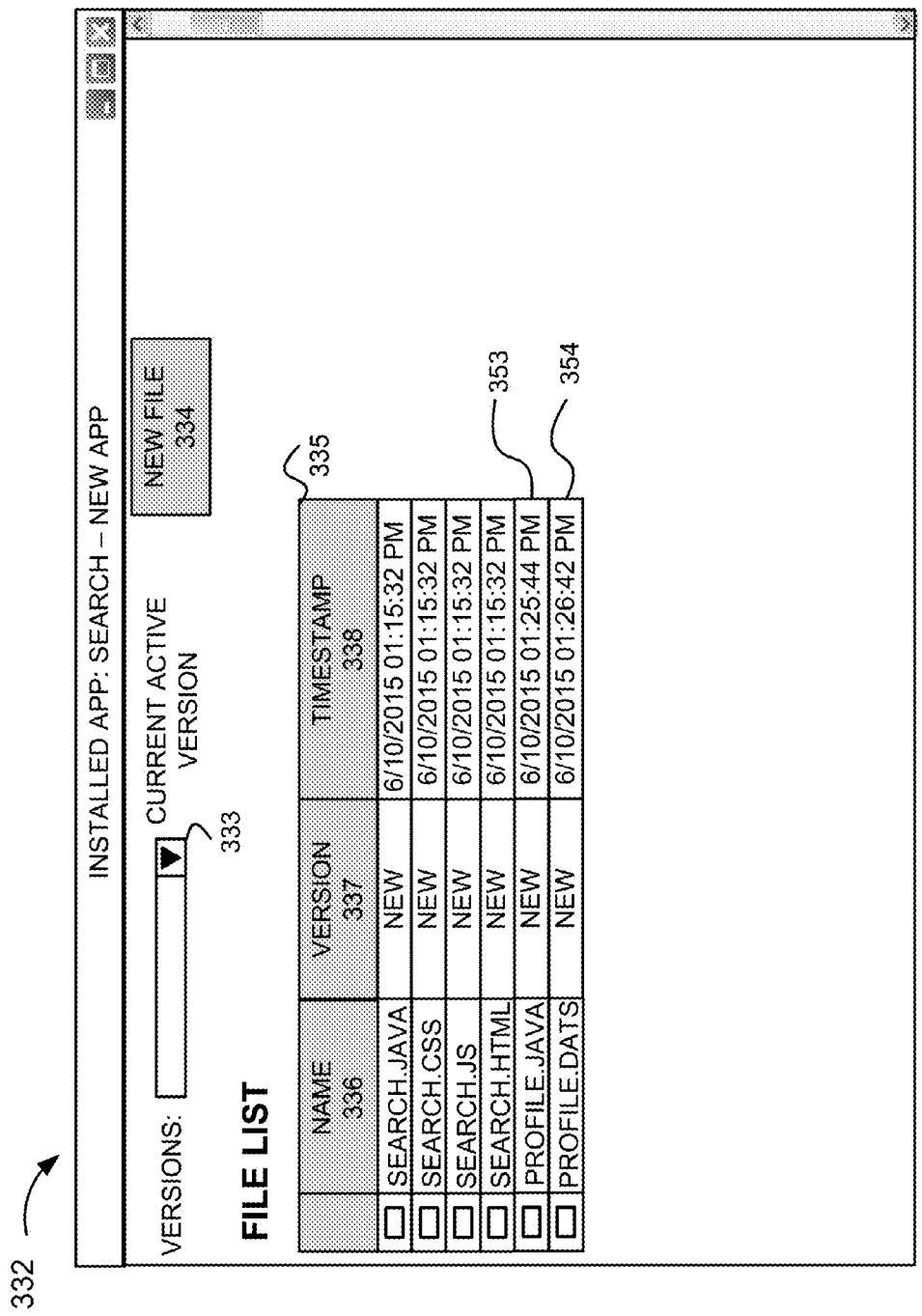
Figure 3H:
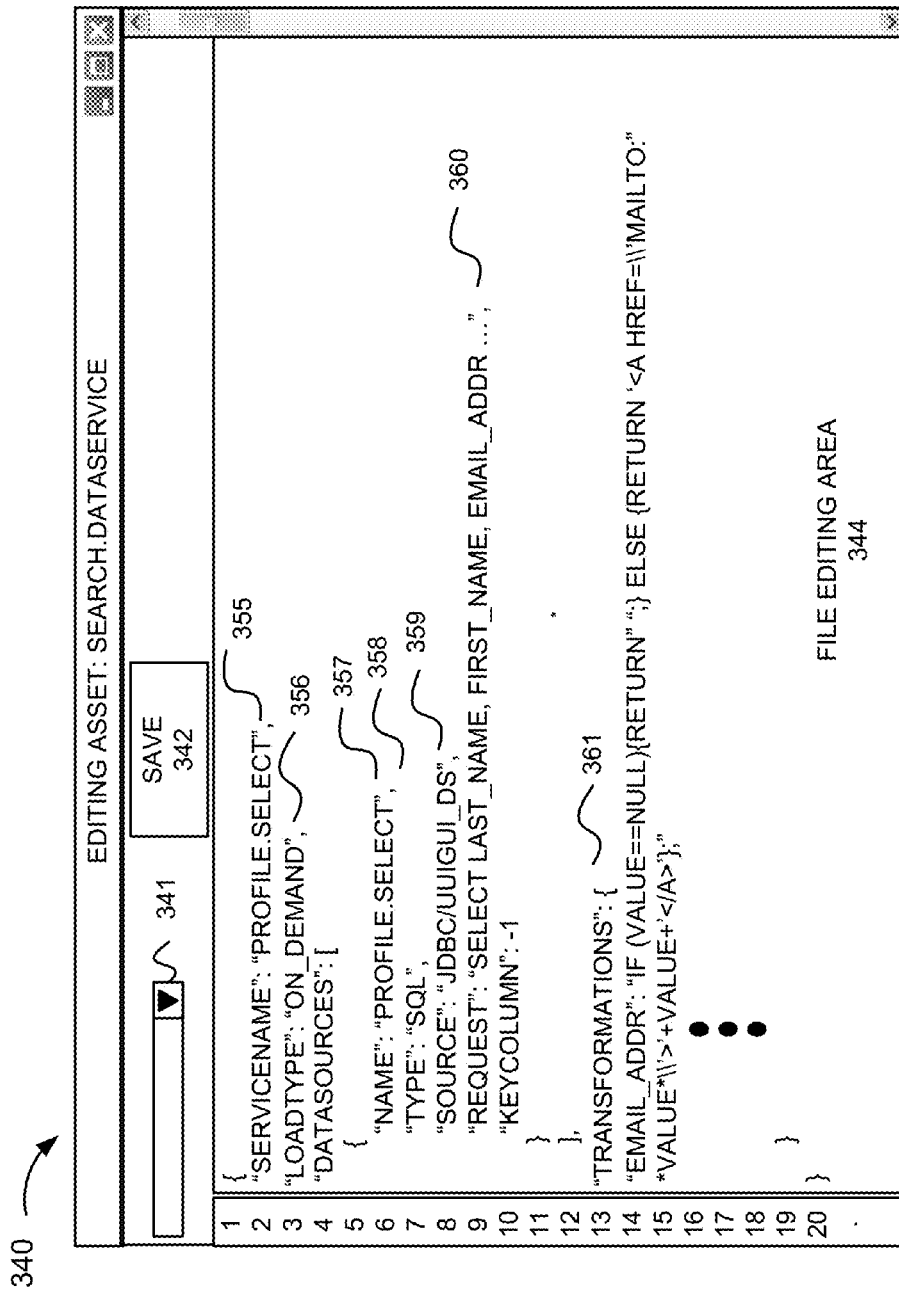

Referring to FIG. 3G, table 335 indicates that two new files have been created, such as a Java file and a data service file (e.g., .dats file), in locations 353 and 354. The data service file specifies various parameters and/or definitions pertaining to a data service so as to obtain the desired data. For example, referring to FIG. 3H, user interface 340 includes exemplary code in file editing area 344 specifying a particular data service. A "servicename" parameter 355 specifies the name of the data service. The developer may select from a toolbox of available data service templates that correspond to the desired data service, which are named. A "loadtype" parameter 356 specifies a particular load type. According to an exemplary implementation, there are different load types. For example, in this example, the data service "profile.select" has an "on-demand" load type, which means when interpreter engine 245 receives a data service request, interpreter engine 245 will perform a lookup in local memory to determine whether the data service is loaded. If the data service is loaded, then interpreter engine 245 will invoke the data service. If the data service is not loaded, interpreter engine 245 will fetch the data service via data cloud 225. Another type is an "initialization" load type, which means when interpreter engine 245 is initialized (e.g., boot-up), the data service is loaded. This load type may be used when for a data service that is frequently used. Yet another type is a "cache" load type, which means when interpreter engine 245 is initialized, the data service is loaded. Additionally, the "cache" load type provides that the data is loaded. That is, the data service does not have to be executed since the data is already retrieved and available. The data may be cached for a pre-configured period (e.g., 24 hours, etc.) and refreshed when the pre-configured period expires. For example, certain types of data (e.g., metadata, etc.) that is static and does not change over time may be attributed to this load type. A "name" parameter 357 specifies the name of the data source. A "type" parameter 358 specifies the type of the data source. According to this example, the type of data source is Structured Query Language (SQL). According to other examples, the type of data source may be a web service, Message Q (MQ), Atom, etc. A "source" parameter 359 indicates a connection pool to use for accessing the data source. According to this example, "source" parameter 359 indicates a JDBC connection or a JDBC pool. Alternatively, "source" parameter 359 may indicate a uniform resource locator (URL) to the JDBC connection. According to other examples, "source" parameter 359 may include a destination address, a file path, etc., pertaining to the requested data. A "request" statement 358 specifies the query. According to this example, since "type" parameter 358 specifies SQL, "request" statement 360 specifies a "select" statement. According to another example, when "type" parameter 358 specifies a Web Service, "request" statement 360 may specify an Extensible Markup Language (XML) statement, which may include "if" statements, loops, variables, etc.

A "transformations" section 361 may provide for transforming data. For example, data received from the data source may be transformed according to the code written in "transformations" section 361. By way of example, an email address may be transformed into a link.

Figure 3I:
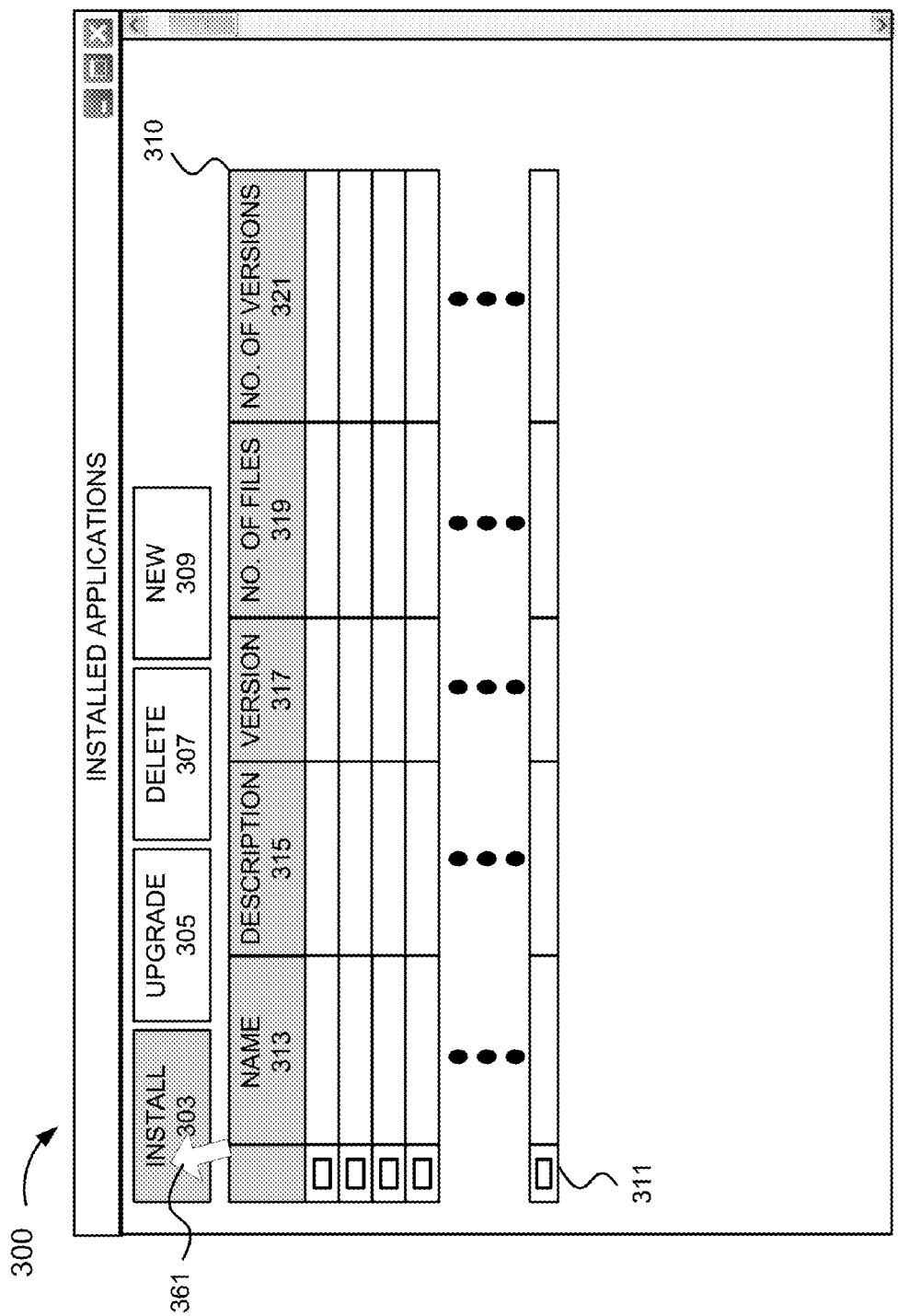
Figure 3J:
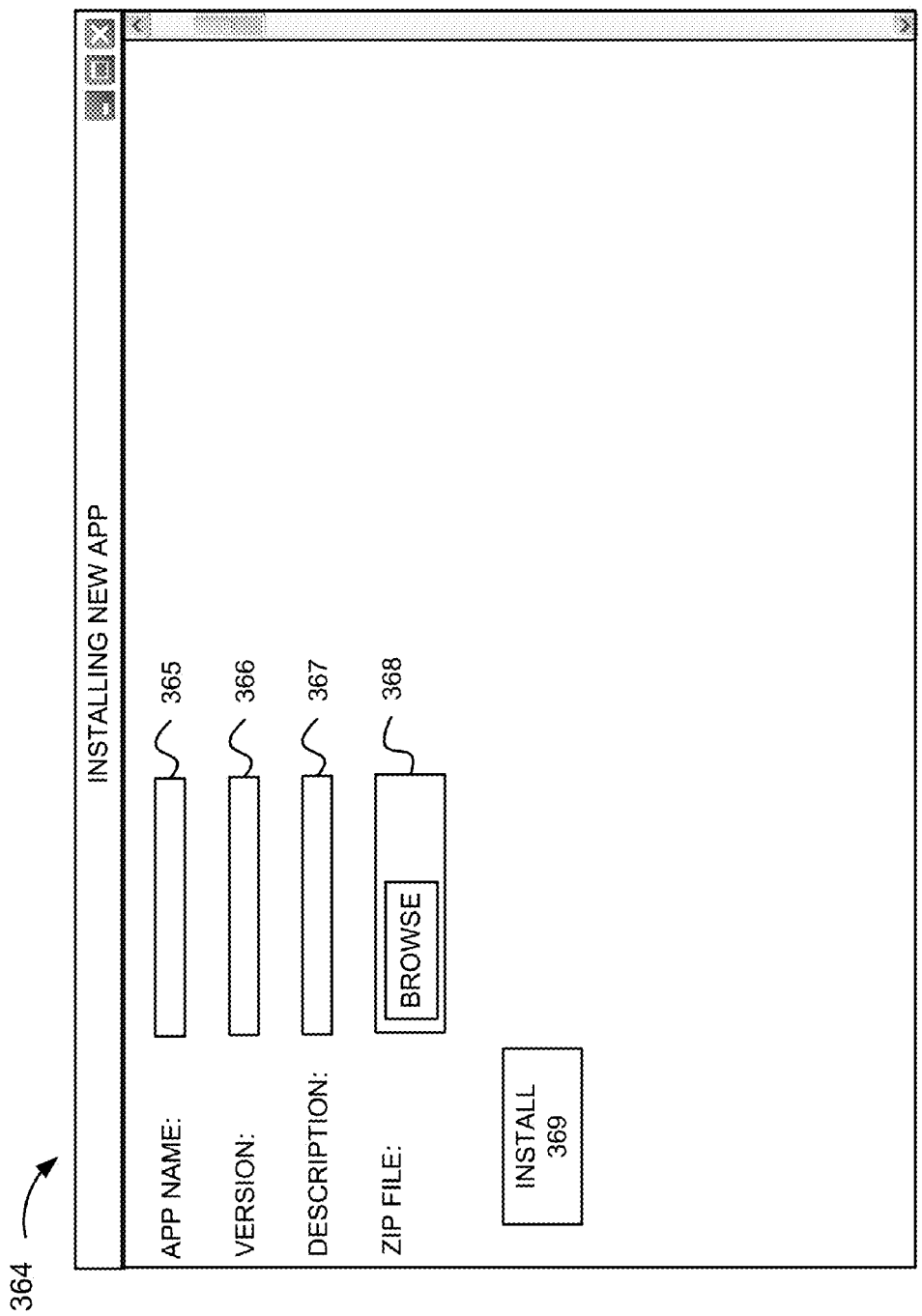

Referring back to FIG. 3G, according to an exemplary embodiment, the files of the new application are stored on user device 150. User 155 may install the new application on network device 110 according to an install process, as described further below. For example, as previously mentioned, the system uses a simple folder structure to store the files of the software. According to an exemplary scenario, assume user 155 creates and stores a compressed file (e.g., a .zip file), which includes the six files illustrated in FIG. 3G. Referring to FIG. 3I, user 155 selects install button 303 using a cursor 361. In response, a user interface 364 is presented to user 155. As illustrated, user interface 364 includes an application name field 365, a version field 366, a description field 367, and a zip file field 368.

Figure 3K:
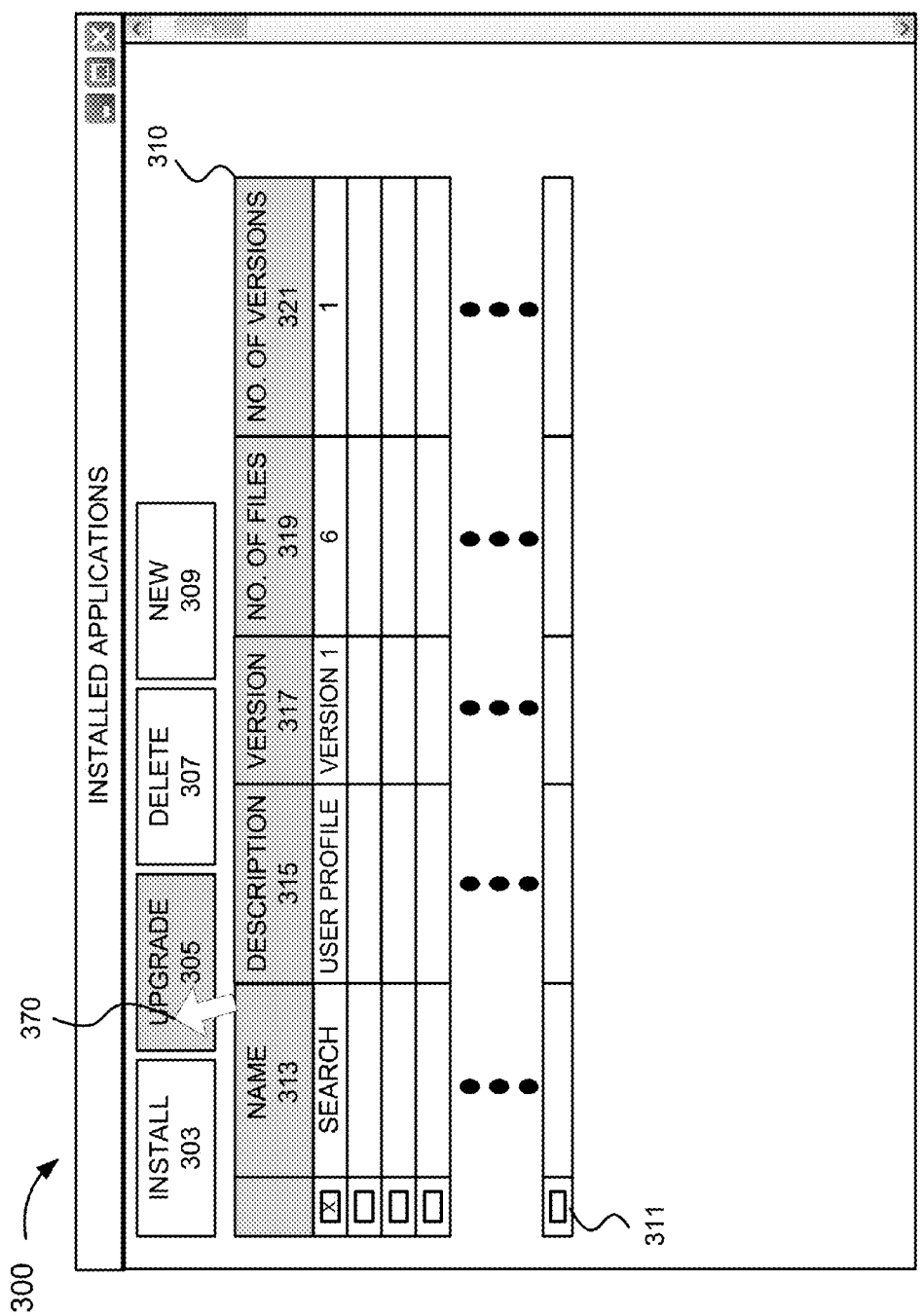

Application name field 365 allows user 155 to specify the name of the application to be installed. Version field 366 allows user 155 to specify the version of the application to be installed. Description field 367 allows user 155 to describe the application to be installed. Zip file field 368 allows user 155 to browse for the zip file that includes all of the application files. According to this example, assume user 155 browses for the zip file that includes the files of the new application. After selecting the zip file, assume user 155 selects an install button 369, which causes the new application to be installed on network device 110. In response to selecting install button 369, user interface 300 is presented to user 155. As illustrated in FIG. 3K, table 310 indicates that the new application is installed. For example, name field 313 indicates the name "search"; description field 315 indicates a description of "user profile"; version field 317 indicates a version of "1"; number of files field 319 indicates that the number of files are "6"; and number of versions field 321 indicates that the number of versions of the new application is "1".

Figure 3L:
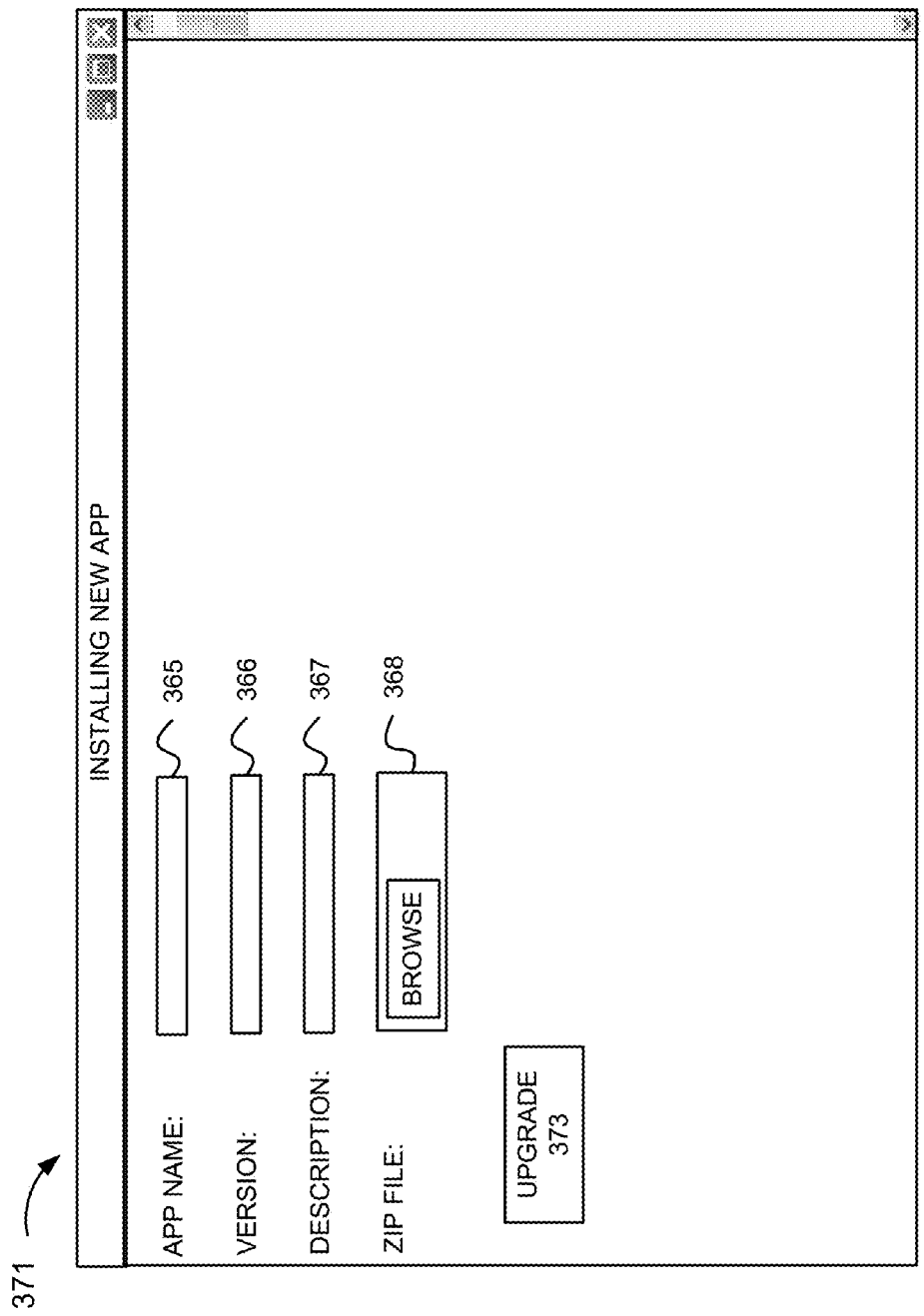

Referring to FIG. 3K, assume that user 155 wishes to make an edit to one or more files of the "search" application. As previously described in relation to FIG. 3C and elsewhere, assume user 155 navigates to and edits the one or more files of the "search" application. After editing the one or more files, user 155 creates and stores another zip file that includes the edited files. Thereafter, user 155 selects the search application in selection area 311 of table 310 and subsequently selects upgrade button 305 using a cursor 370. In response to selecting upgrade button 305, and referring to FIG. 3L, user 155 is presented with a user interface 371. User interface 371 includes graphical elements similar to those previously described in relation to user interface 364, namely application name field 365, version field 366, description field 367, and zip file field 368. Additionally, user interface 371 includes an upgrade button 373.

Figure 3M:
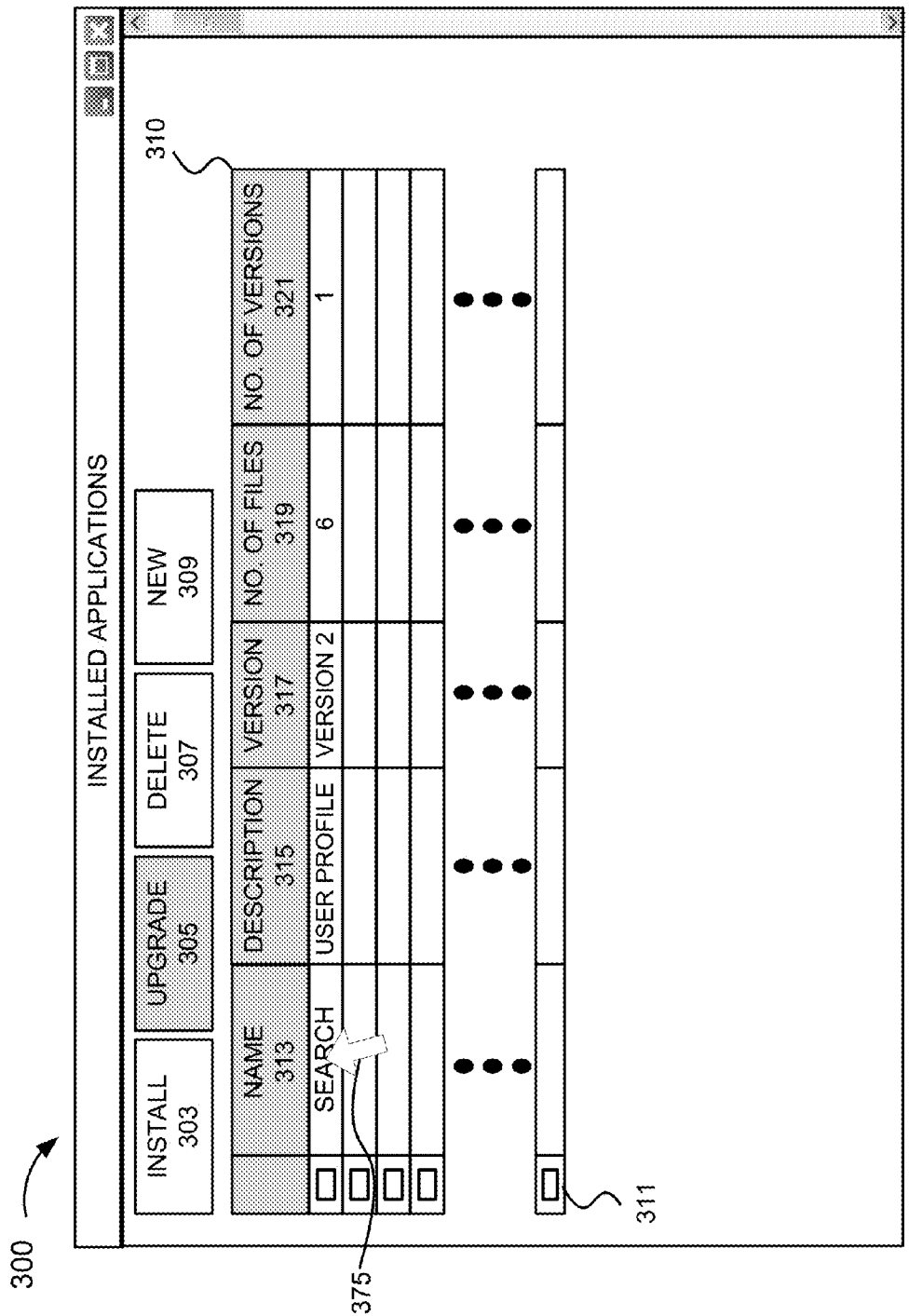

According to this example, that application name field 365, version field 366, and description field 367 are already filled with information pertaining to the first version of the "search" application. User 155 changes version field 366 to indicate "version 2." Additionally, user 155 searches for and selects the newly stored zip file via zip file field 368. Thereafter, user 155 selects upgrade button 373. Referring to FIG. 3M, user 155 navigates back to user interface 300. As illustrated, version field 317 indicates "version 2" of the "search" application.

Figure 3N:
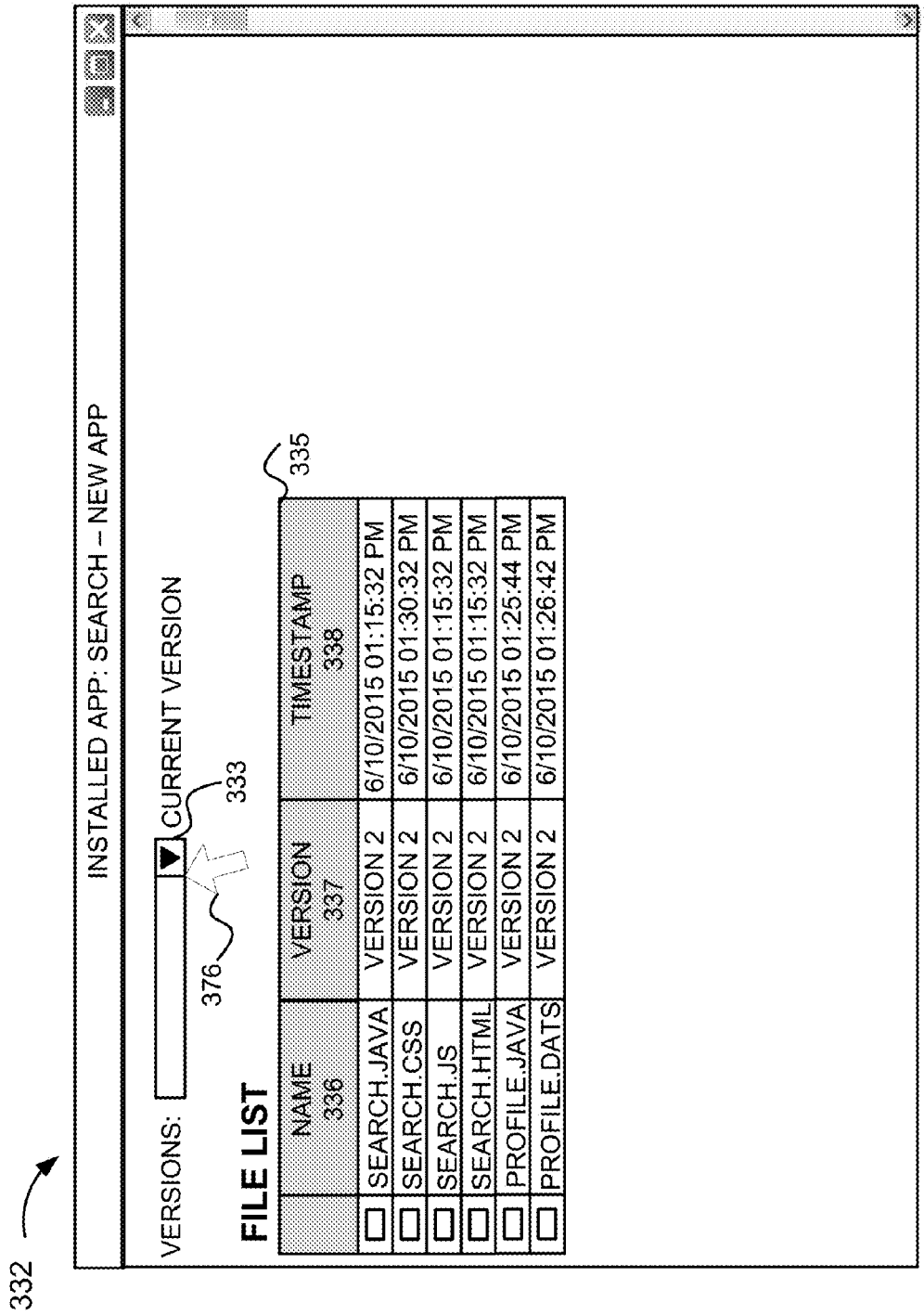
Figure 3O:
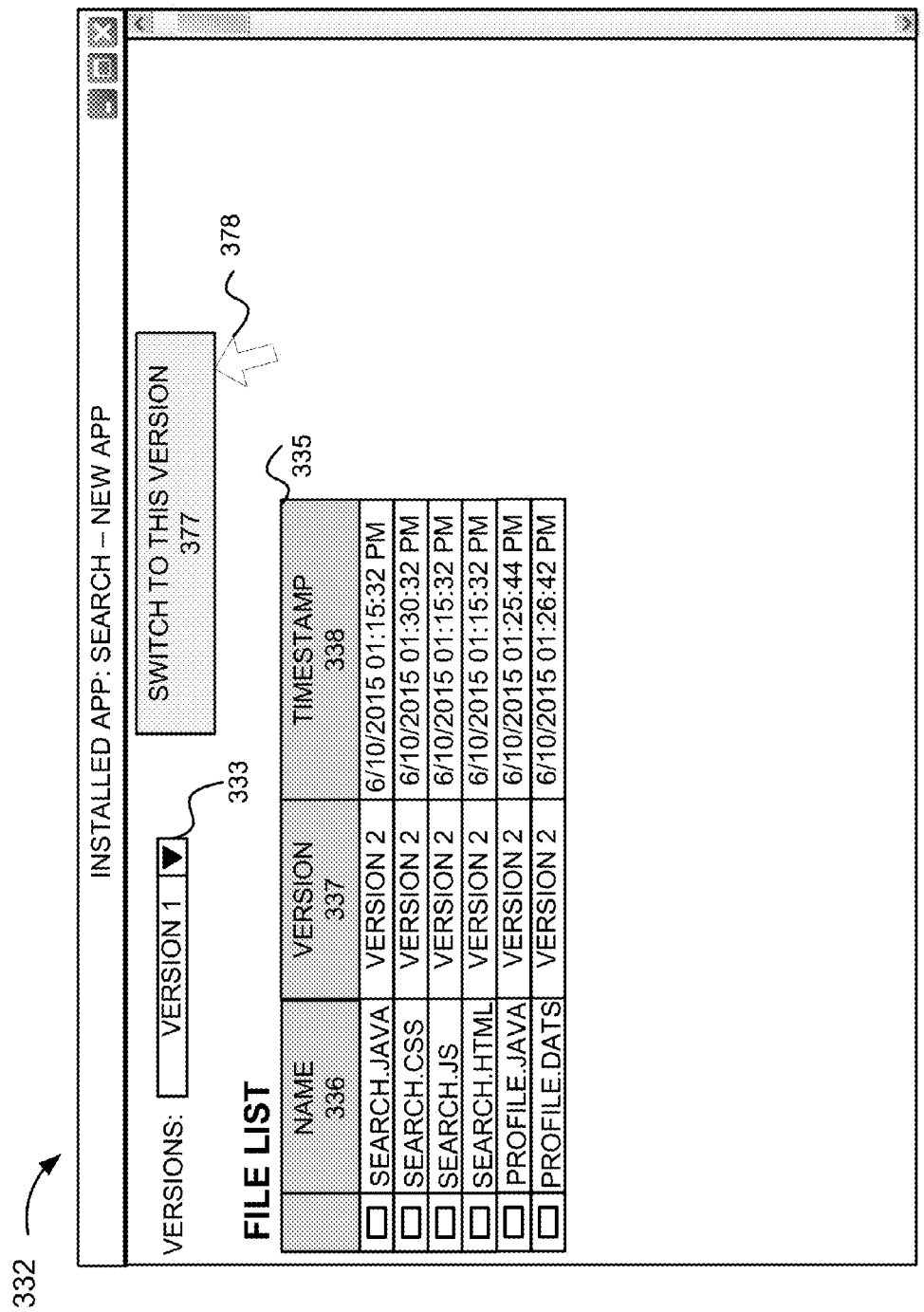
Figure 3P:
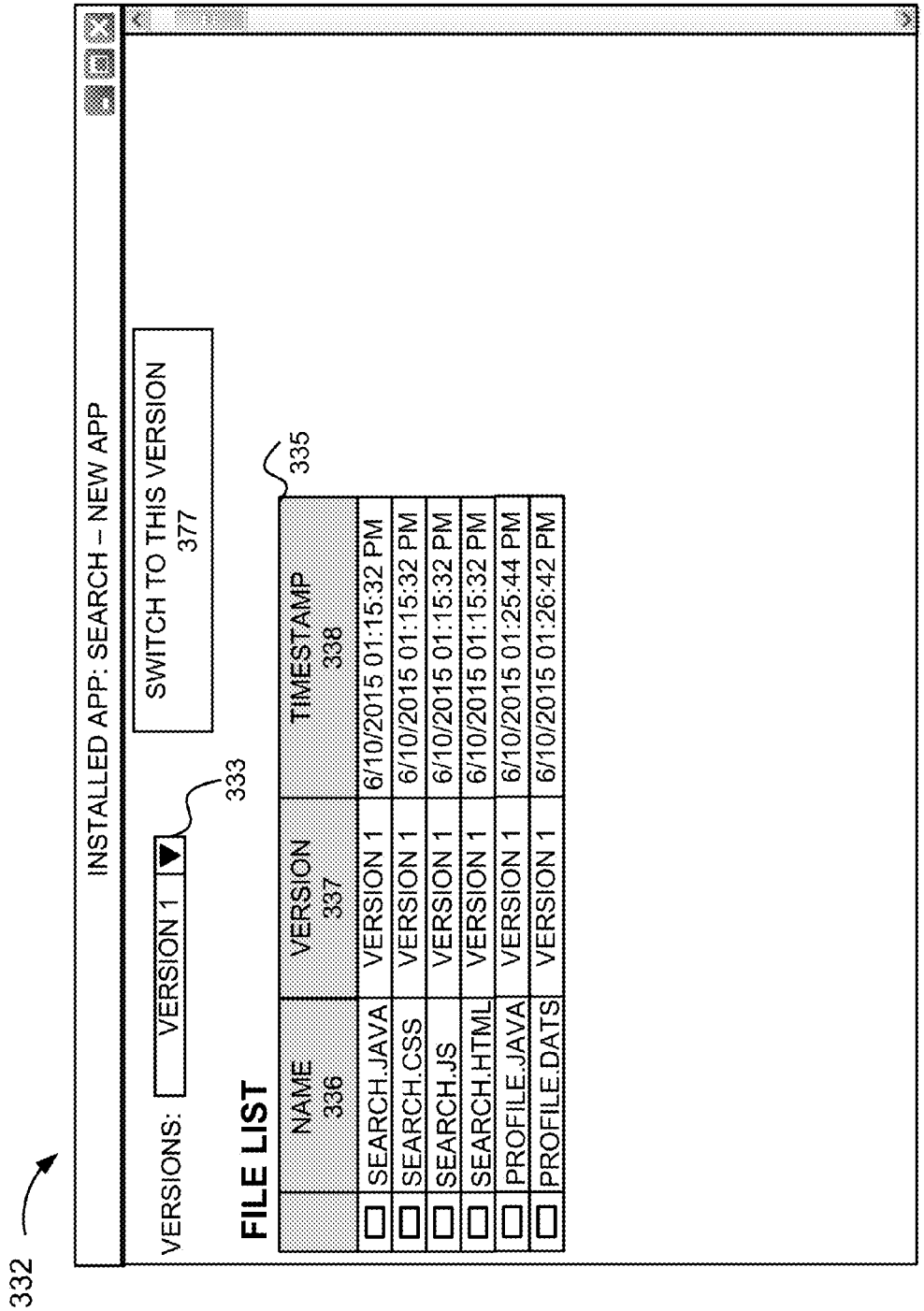
Figure 3Q:
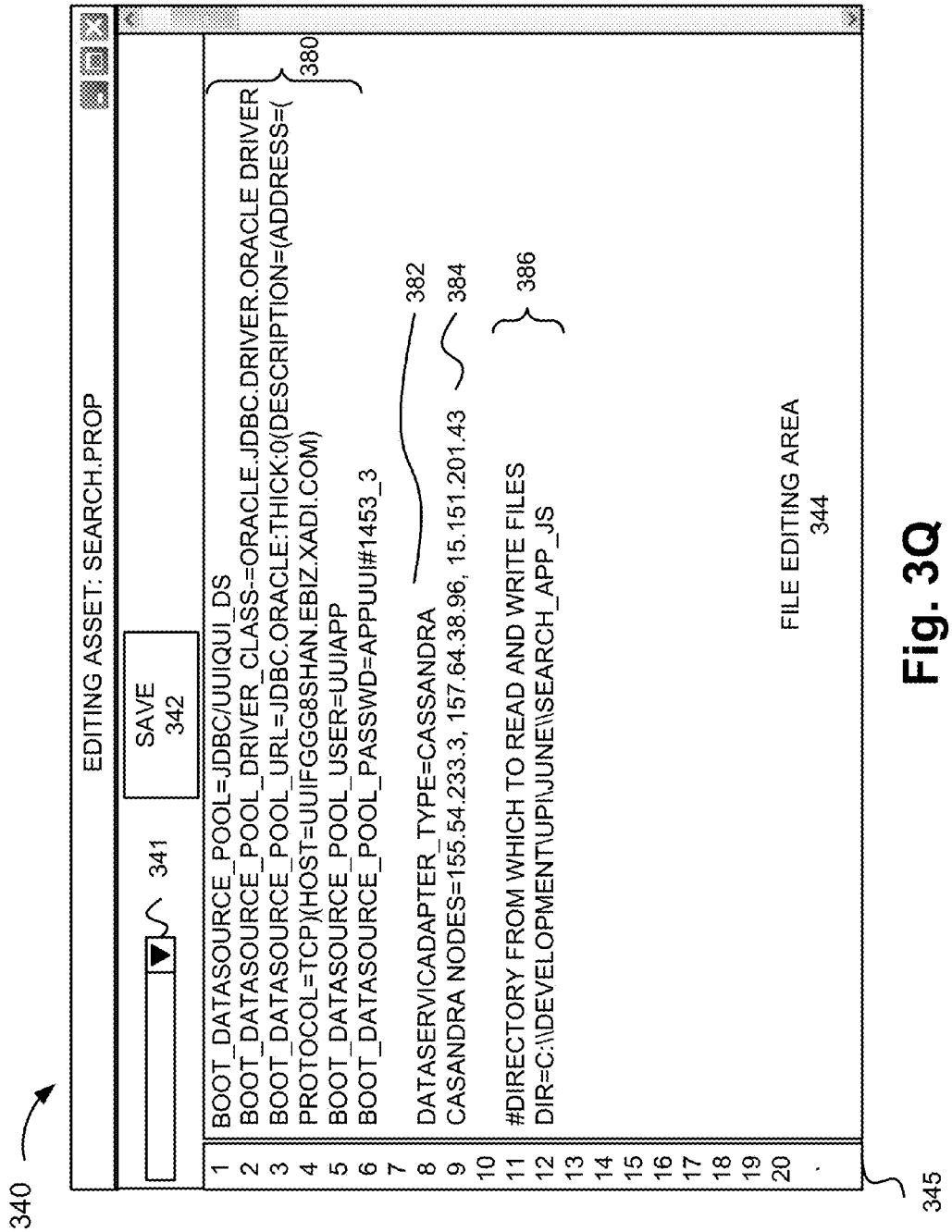

Continuing with the example, assume user 155 wishes to change back one or more files of "search application." User 155 selects the selectable application name in name field 313 of table 310 using a cursor 375. In response, user 155 is navigated to user interface 332, which lists the files of the "search" application of version 2 in table 335, as illustrated in FIG. 3N. User 155 selects versions field 333 using a cursor 376, and a drop down menu is presented to user 155. User 155 may select from a "version 1" and a "version 2." According to this example, assume user 155 selects "version 1" from versions field 333. Referring to FIG. 3O, after selecting "version 1" of the "search" application, user 155 selects a switch to this version button 377. Thereafter, referring to FIG. 3P, table 335 of user interface 332 indicates that version 1 of the "search" application is deployed. In this way, user 155 has easily rolled back the deployment of the "search" application to a previous version. Additionally, user 155 may just as easily roll forward to "version 2" in a manner similar to that previously described.

During development of software using the software service, user 155 may wish to use a particular data source. Thus, referring back to FIG. 3G, when user 155 creates and stores a compressed file (e.g., a .zip file), user 155 may author a file (e.g., a properties file), that specifies parameters to obtain the needed data via data cloud 225. For example, user 155 may configure connection pools to the data source. By way of further example, referring to FIG. 3Q, assume user 155 is authoring a properties file. As illustrated, the properties file includes statements 380 pertaining to the configuration of a data source pool connection. Additionally, the properties file includes a statement 382 pertaining to the data service adapter type. According to this example, the adapter type is "Cassandra." According to other examples, the software service supports other adapter types, such as Oracle, etc. The properties file also includes a statement 384 that indicates the network addresses of the nodes (e.g., "Cassandra Nodes") from which the data is to be retrieved.

Additionally, as further illustrated, statements 386 indicates a directory from which to read and write files.

According to an exemplary embodiment, when user 155 wishes to execute the software, network device 110 uses the connection pool configuration file to dynamically create the connection pool, etc., as specified in the connection pool configuration file so that the data may be obtained as called for by the software.

Figure 4:
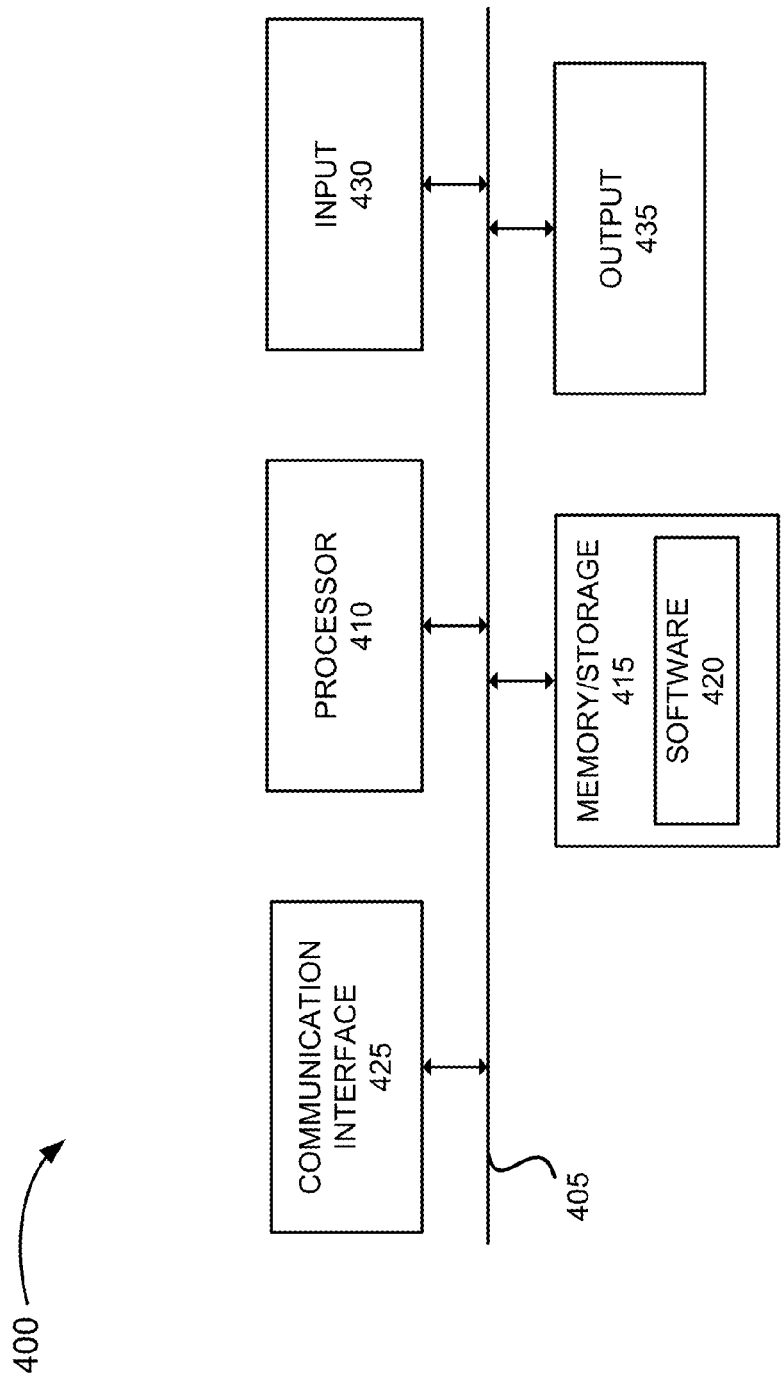
FIG. 4 is a diagram illustrating exemplary components of a device that may correspond to one or more of the devices illustrated in FIG. 1.

FIG. 4 is a diagram illustrating exemplary components of a device 400 that may correspond to one or more of the devices in the environments described herein. For example, device 400 may correspond to network device 110, network device 115, and user device 150. As illustrated, according to an exemplary embodiment, device 400 includes a bus, 405, a processor 410, memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the elements of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 415 may store data, software, and/or instructions related to the operation of device 400.

Software 420 includes an application or a computer program that provides a function and/or a process. Software 420 may include firmware, middleware, microcode, hardware description language (HDL), or other form of instruction. For example, with reference to network device 110, software 420 may include an application that, when executed by processor 410, provides the software service, as described herein. Additionally, for example, with reference to user device 150, software 420 may include an application that, when executed by processor 410, provides access and use of the software service, as described herein.

Communication interface 425 permits device 400 to communicate with other devices, networks, systems, etc. Communication interface 425 may include one or multiple wireless interfaces and/or wired interfaces. Communication interface 425 may include one or multiple transmitters and receivers or transceivers. Communication interface 425 may include one or multiple antennas. Communication interface 425 may operate according to various protocols (e.g., HTTP, Internet Protocol (IP), Transmission Control Protocol (TCP), etc.), networking standards (e.g., Internet standards, Web standards, etc.), etc.

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 may cause processor 410 to perform a process described herein. Alternatively, for example, according to other implementations, device 400 may perform a process described herein based on the operation of hardware (processor 410, etc.).

Figure 5:
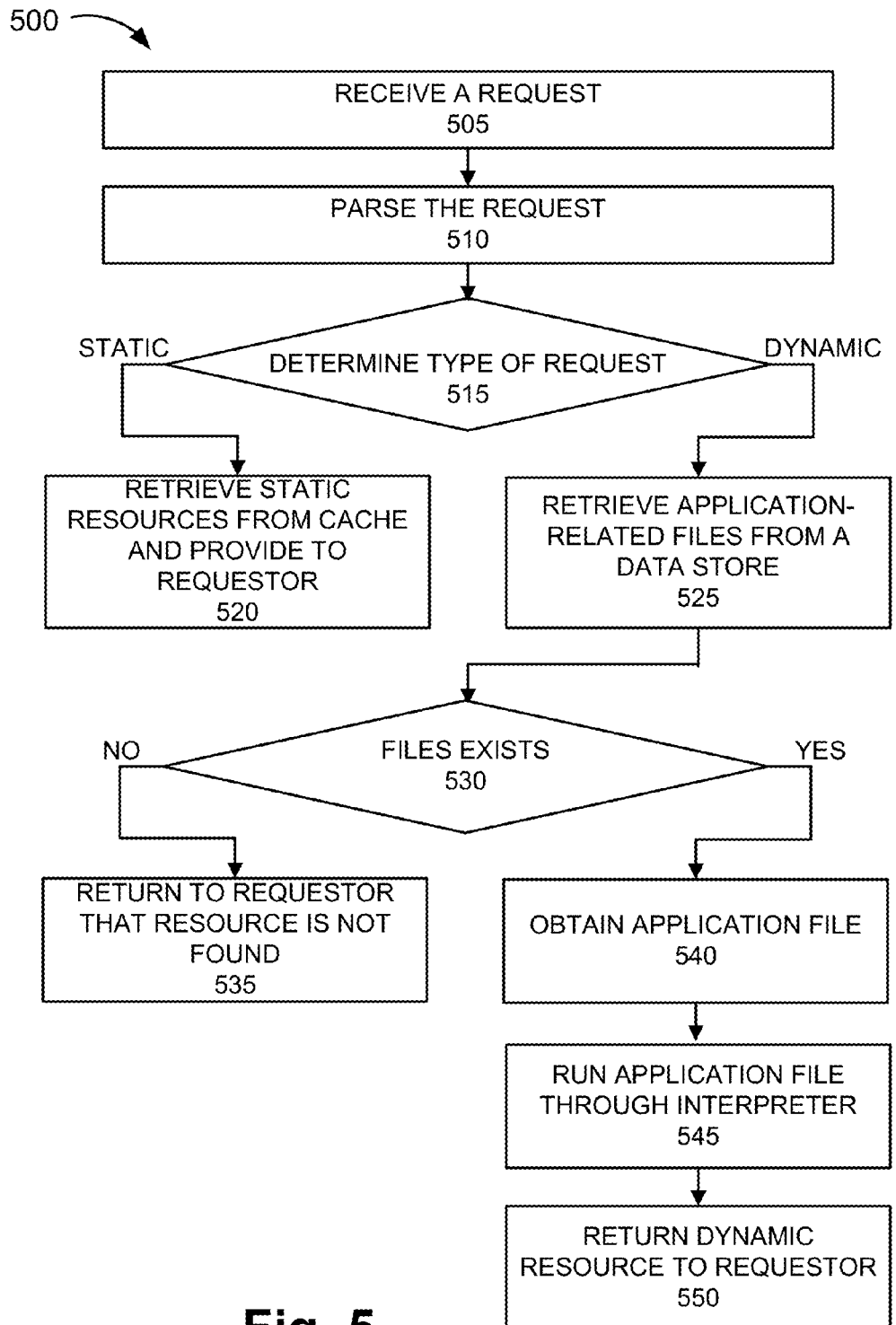
FIG. 5 is a diagram illustrating an exemplary process pertaining to the software service.

FIG. 5 is a flow diagram that illustrates an exemplary process 500 pertaining to the software service. Process 500 is directed to a process previously described above with respect to FIGS. 2 and 3A-3N and elsewhere in this description, in which network device 110 services a request received from user device 150 via client 152. According to an exemplary embodiment, network device 110 performs the steps described in process 500. For example, processor 410 may execute software 420 to provide the software service.

Process 500 may be performed during the running of an application. Process 500 may be iterated any number of times during the running of the application based on the number of requests that occur during the running of the application and a session with client 152 (e.g., a web browser).

Referring to FIG. 5, process 500 may begin, in block 505, a request is received. For example, user 155 of user device 150 wishes to invoke or run an application. User device 150 transmits a request (e.g., an HTTP request) to software service 112 of network device 110. It may be assumed that the application is stored in data store/resources 254. For example, as previously described, user 155 may upload, via user device 150, a zip folder that includes the application files, to software service 112 of network device 110.

In block 510, the request is parsed. For example, parser and analyzer 243 parses the request and identifies a request line and/or a header of the request. Parser and analyzer 243 identifies a URL included in the request.

In block 515, it is determined the type of request. For example, parser and analyzer 243 determines whether the request is a static request or a dynamic request based on a string included in the URL. When it is determined that the type of request is static (block 515—Static), resources from cache are retrieved and returned (520). For example, content server 247 includes a RESTful web service component, as previously described. By way of further example, content server 247 checks whether an entity tag value received in a conditional GET request matches the latest entity tag value for the requested resource. Content server 247 performs a lookup based on the entity tag value to determine whether the resource is stored in cache (e.g., which stores a mapping between resources and entity tag values). When there is a match between entity tag values, content server 247 returns an HTTP status code of 304, in which the status code signifies to the browser to use the browser's cached version of the file. When there is not a match between entity tag values, content server 247 retrieves the resource via data cloud 225, and returns the resource along with an updated entity tag value to the browser. Content server 247 may subsequently cache the resource.

When it is determined that the type of request is dynamic (block 515—Dynamic), application-related files are retrieved from the data store (block 525). For example, when parser and analyzer 243 determines that the request is a dynamic request based on the URL, content server 247 may obtain all application-related files. For example, as previously described, according to an exemplary implementation, the string in the URL may indicate an application name. Content server 247 may use the string as a referent to obtain all (application) file(s) referenced by the string. Content server 247 may invoke the data service via data cloud 225 to obtain the file(s) based on the string included in the URL.

According to an exemplary implementation, when application files are deployed, these files are stored in data store/resources 254. For example, as previously described, a developer may upload a zip file. The zip file may be stored in a master folder. The name of the master folder may correspond to the string in the URL that indicates the application name. When user 155 wishes to invoke or run the application, user 155 may select an icon, via a user interface of system 12, which indicates the application. System 12 configures the icon such that the icon is associated with the URL, which includes the string. Thus, upon selecting the icon, the string in the URL includes the name of the application and is a referent to the application file(s).

In block 530, it is determined whether the file(s) exist(s). For example, depending on the response and/or communication between content server 247 and data cloud 225, content server 247 determines whether the file(s) exist.

When it is determined that the file(s) does/do not exist (block 530—NO), an error message is returned (block 535). For example, content server 247 returns a resource not found message (e.g., an HTTP status coded 404) to the browser.

When it is determined that the file(s) does/do exist (block 530—YES), an application file is identified (block 540). For example, content server 247 identifies an application-coded file, such as a Java file based on the string (e.g., an application name). The application file(s) is/are included in the zip file. When a request is made for one of those application files, which is determined by examining the URL, content server 247 selects the application file. The application file is fed to interpreter engine 245.

In block 545, the application file is executed. For example, interpreter engine 245 executes the code included in the application file identified and selected by content server 247. For example, the contents of the application file are obtained from the data store/resources 254 and passed to interpreter engine 254. The code in the application file, when executed, may perform one or more functions. By way of example, the executed code may query a database and render HTML. The result of the execution of the code may be returned to the browser.

In block 550, the dynamic resource is returned. Content server 247 returns the dynamic resource to the browser. For example, when the application file includes HTML that needs to be generated, content server 247 uses a template engine (e.g., a FreeMarker engine) to generate the HTML content. The HTML content may include references to a CSS file, a JavaScript file, etc. Thus, additional data may be generated and returned to the browser.

Although FIG. 5 illustrates an exemplary process pertaining to the software service, according to other embodiments, process 500 may include additional operations, fewer operations, and/or different operations than those illustrated in FIG. 5, and as described herein. According to an exemplary embodiment, in block 515, the step of determining the type of request constitutes a binary choice. Thus, the type of request is limited to either a static request or a dynamic request, and the type of request cannot be both a static request and a dynamic request.

As described, the software service includes a data service. The data service provides developers with a template-based approach to call a data service and obtain data without having to write code to configure a plug-in, set up a connection to a data source, etc. Rather, data cloud 225 may store data service definition data pertaining to various data services that can be called and used to obtain data. The data service definition data provides a template to invoke and use a data service. An example of the data service definition data was previously explained above in relation to FIG. 3H.

Figure 6:
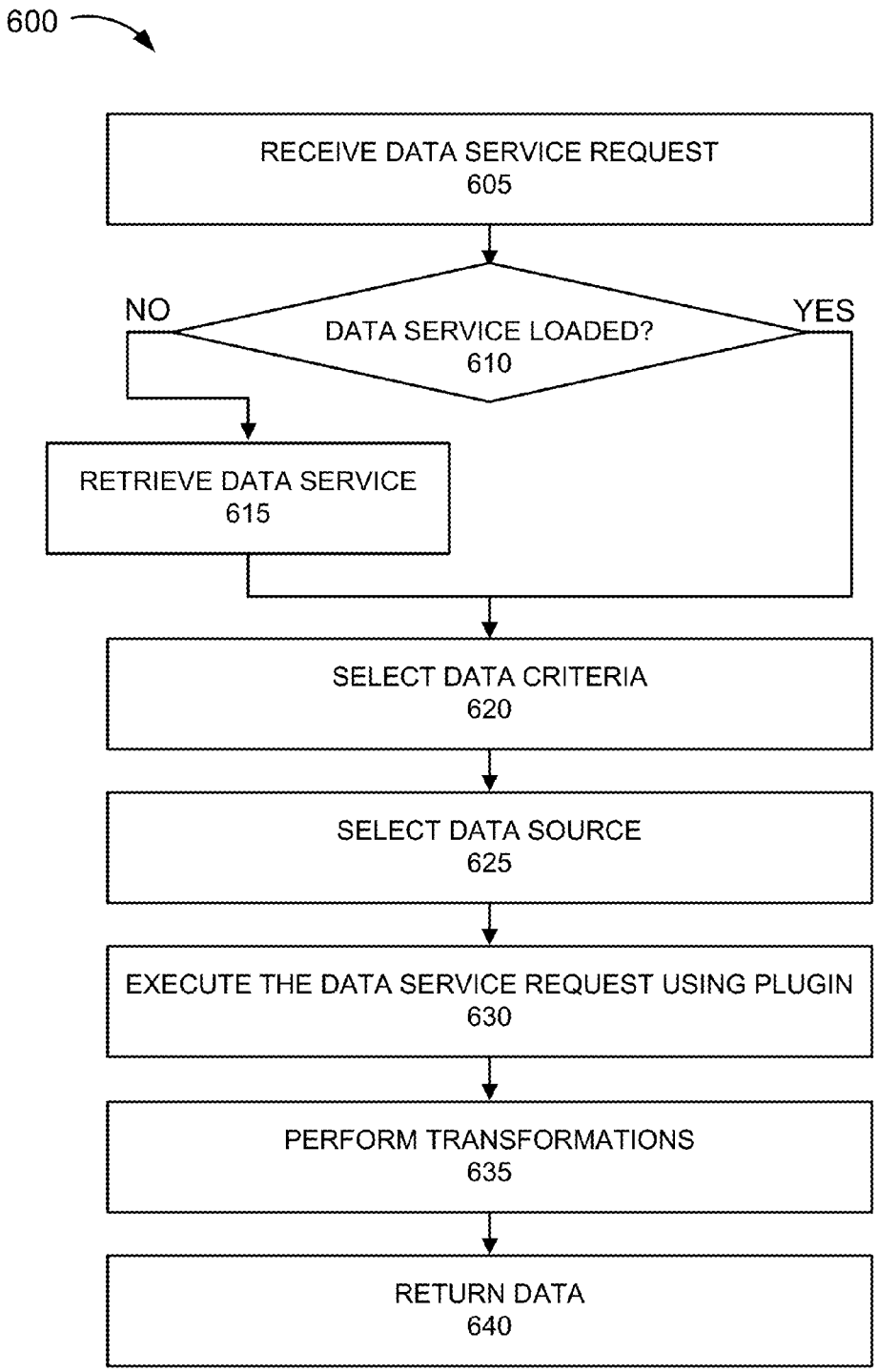
FIG. 6 is a diagram illustrating another exemplary process pertaining to the software service.

FIG. 6 is a flow diagram that illustrates another exemplary process 600 pertaining to the data service process included in the software service. Process 600 is directed to a process previously described above with respect to FIGS. 2 and 3H and elsewhere in this description, in which data cloud 225 services data requests. According to an exemplary embodiment, network device 110 performs the steps described in process 600. For example, processor 410 may execute software 420 to provide the data service. Process 600 may be performed as a part of blocks 545 and 550 of process 500.

Referring to FIG. 6, process 600 may begin, in block 605, in which a data service request is received. For example, data service interface layer 230 receives a request from engine 240. The data service request pertains to data needed to satisfy a dynamic request, such as a dynamic request explained in process 500 and elsewhere in this description. The data service request may carry data service definition data that defines a data service and allows the data service to retrieve the desired data via the data service. For example, the data service definition data may include a name of a data service, a destination or an endpoint pertaining to where the requested data may be obtained (e.g., a network address, a file path, etc.), arguments and/or parameters required by the data service (e.g., configuration data, input data, transformations, etc.). By way of example, when the data service request is directed to an SQL query, the data service request includes SQL, or when the data service request is directed to a web service, the data service request includes XML for the web service, or when the data service request is directed to a RESTful API, the data service request includes JSON data.

In block 610, it is determined whether the data service is loaded. For example, data service interface layer 230 inspects the data service request and identifies the type of data service needed to satisfy the data service request. By way of example, the type of data service is specified by name in the application-coded file, which in turn, when executed by interpreter engine 245, is identified and submitted to data service interface layer 230 via the data service request. Data service interface layer 230 determines whether the requested data service is loaded in memory. For example, the requested data service may be a data query to a database table, a web service call, an SQL service, a RESTful API, etc.

When it is determined that the data service is not loaded (block 610-NO), then the data service is retrieved (block 615). For example, when data service interface layer 230 determines that the data service is not loaded, data service interface layer 230 retrieves the requested data service definition data. Data service interface layer 230 loads the data service definition data. For example, data service interface layer 230 uses data source layer 233. By way of further example, data service interface layer 230 may perform a lookup in a database and a fetch, and subsequently load the data service definition data based on the name of the data service included in the data service request. When it is determined that the data service is loaded (block 610—YES), then process 600 continues to block 620.

In block 620, data criteria are selected. For example, data service interface layer 230 selects the input data, which are included in the data service request. For example, assume that the data service request includes an SQL query pertaining to an individual. The input data may include the name of the individual and/or other values pertaining to the individual.

In block 625, a data source is selected. For example, data service interface layer 230 selects a data source based on the data parameters included in the data service request. Data service interface layer 230 determines a type of connection needed to obtain the requested data from the data source. For example, when the data source is an SQL source, data service interface layer 230 may open a Java Database (JDBC) connection to enable communication with the data source.

In block 630, the data service request is executed using a plug-in. Data source layer 233 executes the loaded data service along with various data (e.g., input data, etc.). Data source layer 233 uses a plug-in, such as a library that executes a particular request. For example, the plug-in may be an SQL plug-in, an MQ plug-in, a web service plug-in, and/or a RESTful API plug-in. During execution, data source layer 233 communicates with the data source (e.g., data store/resources 254) to obtain the requested data. Data source layer 233 obtains and stores the requested data.

In block 635, transformations are performed. For example, data transform layer 235 performs transformations pertaining to the obtained data. For example, the data service request indicates that a portion or all of the data should be transformed. By way of example, an instance of data pertaining to dates may be transformed into data indicating local time, data instances that are in upper case letters may be transformed into lower case letters, etc. Data transform layer 235 may manipulate, add, remove, etc., data in various ways depending on transformation rules associated with a data service. When the data service request does not specify a data service that includes data transformation and/or the data service request does not carry parameters pertaining to data transformation, block 635 may not be performed.

In block 640, data is returned. For example, data service interface layer 230 returns the data to engine 240. Engine 240 may determine whether the data is to be returned as HTML data or JSON data. For example, when an HTML output needs to be generated, engine 240 generates text output (e.g., an HTML web page, etc.) based on a template engine (e.g., a FreeMarker engine), and changes the data. Engine 240 will also include any relevant CSS element and/or JavaScript element that need(s) to be sent to the web browser. During the interpretation process, calls to other systems or databases may be performed using data service interface layer 230 in data cloud 225 for the purpose of retrieving data that will be used in applying business logic or generating HTML content. Otherwise, when JSON data is output, the JSON data is sent to the web browser.

Although FIG. 6 illustrates an exemplary data service process, according to other embodiments, process 600 may include additional operations, fewer operations, and/or different operations than those illustrated in FIG. 6, and as described herein.

According to an exemplary embodiment, applications that are developed, tested, and deployed via software service 112 are made available to end users. For example, according to an exemplary embodiment and referring to FIG. 7, users may access and use an application via software service 112, as described further below. Software service 112 may be implemented in a variety of environments. For example, software service 112 may be implemented within an enterprise environment, a public environment, a private environment, etc., which allows the users access and use of the applications.

According to an exemplary embodiment, the application is a browser-based application. The browser-based application may be rendered on various user devices (e.g., user device 150). According to an exemplary embodiment, the application runs via engine 240. In this regard, software service 112 provides a dual service that includes allowing a developer to develop, test, and deploy an application, and allowing an end user to access and use the application that has been deployed. Additionally, in view of this exemplary environment, end user feedback of a deployed, application may more readily be addressed by developers based on the processes described herein. For example, consider that a developer receives feedback from an end user regarding a bug in relation to a deployed, application. In response, the developer edits one of the files via administrative module 250, creates a new version of the application, and deploys the new application in a manner previously described. Thereafter, all end users will have immediate access of the newly deployed version of the application and be able to run the newly deployed version of the application via engine 240.

According to an exemplary embodiment, the CSS used by applications allows for automatic rendering of screens based on the user device. For example, a desktop computer, a mobile phone, and a tablet device may each have different screen renderings when using the same application. According to an exemplary embodiment, an Applications Content Manager (ACM) can recognize the type of user device. For example, the ACM can determine the type of user device based on attributes included in a request (e.g., a URL) via a browser to use an application. In response, the ACM can invoke a particular version of the application that is tailored for the identified type of user device. In this regard, software service 112 may deploy multiple versions of the application that are tailored to different types of user device and/or characteristics thereof (e.g., operating systems, hardware characteristics (e.g., resolution of display, size of display, processor, etc.).

Referring to FIG. 7, software service 112 includes an ACM 705. ACM 705 provides an application management service, as described herein. User 755 may access and use deployed applications via client 152 of user device 150. For example, user 755 initiates a session with ACM 705 via client 152 by entering a URL via client 152. According to one implementation, ACM 705 obtains device information (e.g., device characteristics pertaining to user device 150) based on the URL. For example, different URLs may correspond to different types of user devices 150 and/or different versions of applications. Additionally, or alternatively, according to other implementations, ACM 705 provides a user interface via which user 755 logs in. Subsequent to a successful login, a plug-in to client 152 may communicate device information to ACM 705. ACM 705 may store and/or access a database that maps device information to versions of applications. Thereafter, ACM 705 may automatically navigate user 755 to a user interface that allows user 755 to use an application that is designed for the type of user device with which user 755 accessed software service 112. According to other embodiments, ACM 705 may provide a user interface that allows user 755 to select from multiple applications. The user interface may be user-customized—similar to a MyApps interface that includes applications used by user 755.

The system described herein may address various issues confronted by software developers. For example, the software service architecture may allow for running one or multiple application processing engines (e.g., engine 240) in one or multiple network devices, in which during the running, the application processing engines may access and use a single, central data store. Users may be required to deploy a complete set of web-application files in to the data store, which may be accessed by any number of the application processing engines. Additionally, the software service architecture may not require any part of the web-application files to be deployed in any of the network devices that host the application processing engines. Additionally, the application processing engines can immediately present to a software developer any changes to a web application stemming from changes to one or more files of the web-application files, by way of interpreting and executing all of the web-application files associated to the web application stored in the data store. The software service architecture also may not require any of the application processing engines, web-containers that may host the application processing engines, and/or any other applications that may run as a part of the application processing engine to have any kind of downtime and/or restart, when deploying new web-application files and/or edited web-application files. Additionally, as described, the software service architecture provides administrative screens for developers to view, edit, manage versions of any of the web-application files belonging to any of the web application stored in the data store and accessed by the application processing engine.

Additionally, the system described herein allows a developer to prepare a web application for deployment. The preparation may include placing all the web-application files in respective sub-folders under a master folder named after the application, creating an archive of the web application files, in which the archive is a collection of all the web-application files in their original form without any compilation or any changes thereto. The archive may be implemented as a zip or a jar. Additionally, the web-application files may include any Java, CSS, HTML template, HTML, script, and/or configuration files.

The foregoing description of embodiments provides illustration, but is not intended to be exhaustive or to limit the embodiments to the precise form disclosed. The specification and drawings are accordingly to be regarded as illustrative rather than restrictive. Various modifications and changes may be made thereto, and additional embodiments may be implemented, without departing from the broader scope of the invention as set forth in the claims that follow.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 415.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
deploying, at a network device, application files of a web-based application, wherein the deploying includes:
receiving an upload of the application files from a user device via a web browser, wherein the application files comprise an application-coded file, a Cascading Style Sheet (CSS) file, a HyperText Markup Language (HTML) file, a configuration file, and a script file; and
storing the application files;
receiving, by the network and from the user device via the web browser, a first request to access the web-based application that has been deployed; and
running, by the network device, the web-based application in response to the first request, and wherein during the running:
determining, by the network device, a type of a second request for data to be used to generate a user interface of the web-based application, wherein the determining comprises:
inspecting, by the network device, a uniform resource locator (URL) included in the second request; and
determining, by the network device, whether the URL includes a string that indicates that the second request is a dynamic request, based on the inspecting;
obtaining, by the network device in response to determining that the type of the second request is the dynamic request, the data based on the type of the second request, wherein the data includes the application files; and
rendering, by the network device, the user interface based on the obtained data.

2. The method of claim 1, wherein, in response to determining that the type of the second request is a static request that requests static data, the method further comprises:
obtaining, by the network device, the static data; and
rendering, by the network device, the user interface based on the static data.

3. The method of claim 2, wherein the determining comprises:
determining, by the network device, that the string indicates that the second request is the static request, based on the inspecting.

4. The method of claim 1, wherein the URL is in a request line or a header of the second request.

5. The method of claim 1, wherein the obtaining includes using the string as a referent to the application files, and the method further comprising:

determining, by the network device, whether the application-coded file is included in the application files, wherein the application-coded file is a Java file;
running, by the network device, the application-coded file through an interpreter in response to determining that the application-coded file is included in the application files, and wherein during the running of the application-coded file through the interpreter, the interpreter uses any of the CSS file, the script file, the configuration file, and the HTML file;
obtaining, by the network device, dynamic data during the running of the application-coded file through the interpreter; and
rendering, by the network device, the dynamic data to the user device via the web browser.

6. The method of claim 5, wherein obtaining the dynamic data further comprises:
generating, by the network device, the dynamic data based on a template engine, wherein the dynamic data comprises HyperText Markup Language (HTML) data or Java Script Object Notation data.

7. The method of claim 1, further comprising:
creating the application files via the web browser; and
editing any of the application files via the web browser.

8. The method of claim 7, further comprising:
uploading, by the user device via the web browser, the application files to the network device.

9. A network device comprising:
a communication interface;
a memory, wherein the memory stores instructions; and
a processor, wherein the processor executes the instructions to:
deploy application files of a web-based application, wherein a deploying includes:
receive, via the communication interface, an upload of the application files from a user device via a web browser, wherein the application files comprise an application-coded file, a Cascading Style Sheet (CSS) file, a HyperText Markup Language (HTML) file, a configuration file, and a script file; and
store the application files;
receive, via the communication interface and from the user device via the web browser, a first request to run the web-based application that has been deployed;
run the web-based application in response to the first request, and wherein during a running of the web-based application:
determine a type of a second request for data to be used to generate a user interface of the web-based application, wherein, when determining, the processor further executes the instructions to:
inspect a uniform resource locator (URL) included in the second request; and
determine whether the URL includes a string that indicates that the second request is a dynamic request, based on the inspection of the URL;
obtain, in response to a determination that the type of the second request is the dynamic request, the data based on the type of the second request, wherein the data includes the application files; and
render the user interface based on the obtained data.

10. The network device of claim 9, wherein, in response to a determination that the type of the second request is a static request that requests static data, the processor further executes the instructions to:
obtain the static data; and
render the user interface based on the static data.

11. The network device of claim 10, wherein, when determining, the processor further executes the instructions to:
  determine that the string indicates that the second request is the static request, based on the inspection of the URL.

12. The network device of claim 9, wherein the URL is in a request line or a header of the second request.

13. The network device of claim 12, wherein the string indicates an application name corresponding to the application files.

14. The network device of claim 12, wherein the string is a referent to the application files, wherein the processor further executes the instructions to:
  determine whether the application-coded file is included in the application files, wherein the application-coded file is a Java file;
  run the application-coded file through an interpreter in response to a determination that the application-coded file is included in the application files, and wherein during the running of the application-coded file through the interpreter, the interpreter uses any of the CSS file, the script file, the configuration file, and the HTML file;
  obtain dynamic data during the running of the application-coded file through the interpreter; and
  render the dynamic data to the user device via the web browser.

15. The network device of claim 14, wherein, when obtaining the dynamic data, the processor further executes the instructions to:
  generate the dynamic data based on a template engine, wherein the dynamic data comprises HyperText Markup Language (HTML) data.

16. A non-transitory storage medium that stores instructions executable by a processor of a computational device to:
  deploy files of a web-based application, wherein a deploying includes:
    receive an upload of the files from a user device via a web browser, wherein the application files comprise an application-coded file, a Cascading Style Sheet (CSS) file, a HyperText Markup Language (HTML) file, a configuration file, and a script file; and
    store the files;
  receive from the user device via the web browser, a first request to run the web-based application that has been deployed;
  retrieve the files in response to the first request;
  run the web-based application subsequent to a retrieval of the files, and wherein during a running of the web-based application:
    determine a type of a second request for data to be used to generate a user interface of the web-based application, wherein the instructions to determine comprises instructions to:
      inspect a uniform resource locator (URL) included in the second request; and
      determine whether the URL includes a string that indicates that the second request is a dynamic request, based on the inspection of the URL;
    obtain, in response to a determination that the type of the second request is the dynamic request, the data based on the type of the second request, wherein the data includes the application files; and
    render the user interface based on the obtained data.

17. The non-transitory storage medium of claim 16, further storing instructions executable by the processor of the computational device to:
  provide, based on a connection with the user device via the web browser, sets of application template files, wherein each set of application template files includes a template core application-coded file, a template Cascading Style Sheet (CSS) file, a template HyperText Markup Language (HTML) file, a template configuration file, and a template script file;
  receive, based on the connection with the user device via the web browser, a user selection of one of the sets of the application template files;
  store, based on the connection with the user device via the web browser, a new application in response to the user selection; and
  provide, based on the connection with the user device via the web browser, an environment to develop the new application, wherein the one of the sets of the application template files is the files of the web-based application.

18. The non-transitory storage medium of claim 17, further storing instructions executable by the processor of the computational device to:
  receive, based on the connection with the user device, via the web browser, a user request to edit one or more of the files;
  edit, based on the connection with the user device, via the web browser, the one or more of the files in response to the user request;
  store the one or more edited files; and
  update the files to include the one or more edited files, wherein the updating includes indicating the updated files as an updated version of the web-based application.

19. The non-transitory storage medium of claim 17, further storing instructions executable by the processor of the computational device to:
  receive, based on the connection with the user device, via the web browser, a user request to rollback the web-based application to a previous version of the web-based application; and
  rollback, based on the connection with the user device, via the web browser, the web-based application to the previous version in response to the user request.

20. The non-transitory storage medium of claim 16, wherein the URL is in a request line or a header of the second request.

* * * * *